US012676124B2

(12) United States Patent
Li et al.

(10) Patent No.: US 12,676,124 B2
(45) Date of Patent: Jul. 7, 2026

(54) DISPLAY METHOD FOR INHIBITING COLOR SEPARATION AND FIELD SEQUENTIAL DISPLAY DEVICE

(71) Applicants: Beijing BOE Display Technology Co., Ltd., Beijing (CN); BOE TECHNOLOGY GROUP CO., LTD., Beijing (CN)

(72) Inventors: Zhifu Li, Beijing (CN); Hao Zhang, Beijing (CN); Jinghua Miao, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 194 days.

(21) Appl. No.: 18/688,774

(22) PCT Filed: Aug. 22, 2022

(86) PCT No.: PCT/CN2022/113845
§ 371 (c)(1),
(2) Date: Mar. 3, 2024

(87) PCT Pub. No.: WO2024/040370
PCT Pub. Date: Feb. 29, 2024

(65) Prior Publication Data

US 2024/0386855 A1 Nov. 21, 2024

(51) Int. Cl.
*G09G 3/34* (2006.01)
*G09G 3/36* (2006.01)

(52) U.S. Cl.
CPC ......... *G09G 3/3413* (2013.01); *G09G 3/3426* (2013.01); *G09G 3/3607* (2013.01);
(Continued)

(58) Field of Classification Search
CPC combination set(s) only.
See application file for complete search history.

(56) References Cited

U.S. PATENT DOCUMENTS

2017/0372668 A1* 12/2017 Yashiki .................... G09G 3/36
2020/0029057 A1* 1/2020 Holmes ................ H04N 9/3114

FOREIGN PATENT DOCUMENTS

CN 109461421 A 3/2019
CN 110114819 A 8/2019
(Continued)

*Primary Examiner* — William Boddie
*Assistant Examiner* — Alecia D English
(74) *Attorney, Agent, or Firm* — HOUTTEMAN LAW LLC

(57) ABSTRACT

A display method for inhibiting color separation, including: acquiring an original image to be displayed, and determining a plurality of frames of sub-images each having a single channel according to the original image; determining backlight data and pixel data of each of the plurality of frames of sub-images; sequentially displaying at least part of sub-images in the plurality of frames of sub-images, in a preset sequence, according to the backlight data and the pixel data of respective frames of sub-images, where the backlight data of any one frame of displayed sub-image serves to drive the backlight assembly to emit light with all colors contained in the backlight assembly, and the backlight data of the sub-images except the any one frame of displayed sub-image serves to drive the backlight assembly to each time emit light with one color contained in the backlight assembly.

19 Claims, 12 Drawing Sheets

(52) U.S. Cl.
CPC ............... *G09G 2320/0233* (2013.01); *G09G 2320/0242* (2013.01)

(56) References Cited

FOREIGN PATENT DOCUMENTS

| | | | |
|---|---|---|---|
| CN | 111080656 | A | 4/2020 |
| CN | 112220438 | A | 1/2021 |
| CN | 113299245 | A | 8/2021 |
| CN | 113744696 | A | 12/2021 |
| TW | I394136 | A | 4/2013 |

* cited by examiner

DISPLAY METHOD FOR INHIBITING COLOR SEPARATION AND FIELD SEQUENTIAL DISPLAY DEVICE

TECHNICAL FIELD

The present disclosure relates to the field of image display technology, and particularly relates to a display method for inhibiting color separation and a field sequential display device.

BACKGROUND

Different from a conventional LCD (Liquid Crystal Display) screen, a backlight of a field sequential display device is composed of a plurality of partitions, each partition includes m×n pixels, and the backlight of each partition is composed of three types of LEDs (Light Emitting diodes), i.e., red, green, and blue LEDs, so that the backlight can display three colors and the brightness of each color can be adjusted. In addition, the pixels of the liquid crystal panel of the field sequential display device can display only gray scale images.

A field sequential color display is a novel color display mode, and each frame of image is divided into three sub-frames of R (red), G (green) and B (blue) for sequential scanning. Due to rotation of an eyeball, the RGB components of an image of a same point scanned according to the time sequence in one frame may fall on different positions on the retina, so that human eyes may perceive color separation of the image, i.e., a color separation phenomenon.

The field sequential display device may be applied to aspects of direct-view display, projection display, helmet display, and the like. When the field sequential display device serves as a VR screen, how to effectively inhibit the color separation phenomenon becomes a technical problem which is required to be solved urgently at present.

SUMMARY

The present disclosure provides a display method for inhibiting color separation and a field sequential display device, for reducing differences between a plurality of frames, reducing perception of human eyes on subsequent frames, and eliminating the color separation phenomenon, through backlight brightness of different colors in the plurality of frames displayed sequentially.

In a first aspect, a display method for inhibiting color separation according to an embodiment of the present disclosure includes:

- acquiring an original image to be displayed, and determining a plurality of frames of sub-images each having a single channel according to the original image, where the plurality of frames of sub-images include a plurality of first sub-images and a second sub-image determined according to the plurality of first sub-images;
- determining backlight data and pixel data of each of the plurality of frames of sub-images, where the backlight data serves to represent a brightness of each color contained in a backlight assembly, and the pixel data serves to represent a pixel value of each pixel unit; and
- sequentially displaying at least part of sub-images in the plurality of frames of sub-images, in a preset sequence, according to the backlight data and the pixel data of respective frames of sub-images, where the number of frames of displayed sub-images is greater than or equal to the number of channels of the original image, the backlight data of any one frame of displayed sub-image serves to drive the backlight assembly to emit light with all colors contained in the backlight assembly, and the backlight data of the sub-images except the any one frame of displayed sub-image serves to drive the backlight assembly to each time emit light with one color contained in the backlight assembly.

As an alternative embodiment,

- the at least part of sub-images to be displayed include the second sub-image, the backlight data of the second sub-image serves to drive the backlight assembly to emit light with all colors contained in the backlight assembly, and the backlight data of the sub-images except the second sub-image serves to drive the backlight assembly to each time emit light with one color contained in the backlight assembly.

As an alternative embodiment,

- the backlight data of a first frame of sub-image in the at least part of sub-images to be displayed serves to drive the backlight assembly to emit light with all colors contained in the backlight assembly, and the backlight data of subsequent frames of sub-images serves to drive the backlight assembly to each time emit light with one color contained in the backlight assembly.

As an alternative embodiment, the plurality of first sub-images and the second sub-image are determined by:

- splitting the original image into a plurality of images each having a single channel, according to the number of channels of the original image, and determining the plurality of images each having a single channel as the plurality of first sub-images; and
- determining the second sub-image according to a minimum pixel value of the plurality of first sub-images at a corresponding position.

As an alternative embodiment, the plurality of first sub-images include an image R, an image G and an image B, and a plurality of frames of original images are acquired, the sequentially displaying the at least part of sub-images in the plurality of frames of sub-images in the preset sequence includes:

- every displaying four frames of original images, sequentially displaying three sub-images of each frame of original image according to a following cyclic sequence:
- when a first frame of original image is displayed, sequentially displaying three sub-images in a sequence of the second sub-image of the first frame of original image, the image R of the first frame of original image and the image G of the first frame of original image;
- when a second frame of original image is displayed, sequentially displaying three sub-images in a sequence of the image B of the second frame of original image, the second sub-image of the second frame of original image and the image R of the second frame of original image;
- when a third frame of original image is displayed, sequentially displaying three sub-images in a sequence of the image G of the third frame of original image, the image B of the third frame of original image and the second sub-image of the third frame of original image; and
- when a fourth frame of original image is displayed, sequentially displaying three sub-images in a sequence of the image R of the fourth frame of original image, the image G of the fourth frame of original image and the image B of the fourth frame of original image.

As an alternative embodiment, a plurality of frames of original images are acquired and it is determined that a current frame of original image to be displayed is not a first frame of original image, and the backlight data of a first frame of sub-image in the at least part of sub-images to be displayed is determined by:

when it is determined that the first frame of sub-image is the second sub-image, determining the backlight data of the first frame of sub-image in each partition in the backlight assembly, according to a mean value of the backlight data of the second sub-image of the current frame of original image in the partition and the backlight data of the second sub-image of a previous frame of original image in the partition.

As an alternative embodiment, the backlight data of each of the plurality of first sub-images is determined by:

determining a maximum difference value in each partition in the backlight assembly, according to a difference value between pixel values of the first sub-image and the second sub-image at a corresponding position in the partition; and determining the backlight data of the first sub-image in each partition, according to the maximum difference value in the partition.

As an alternative embodiment, a plurality of frames of original images are acquired and it is determined that a current frame of original image to be displayed is not a first frame of original image, and the backlight data of a first frame of sub-image in the at least part of sub-images to be displayed is determined by:

when it is determined that the first frame of sub-image is the second sub-image, determining the backlight data of the first frame of sub-image in each partition in the backlight assembly, according to a mean value of the backlight data of the second sub-image of the current frame of original image in the partition and the backlight data of the second sub-image of a previous frame of original image in the partition.

As an alternative embodiment, the backlight data of the second sub-image is determined by:

determining the backlight data of the second sub-image in each partition in the backlight assembly, according to a maximum value of pixel values of the second sub-image in the partition.

As an alternative embodiment, the pixel data of each of the plurality of first sub-images are determined by:

determining the pixel data of the first sub-image, according to a ratio of a difference value between pixel values of the first sub-image and the second sub-image at a corresponding position to the backlight data of a partition, where a pixel point at the corresponding position is located, in the backlight assembly.

As an alternative embodiment, a plurality of frames of original images are acquired and it is determined that a current frame of original image to be displayed is not a first frame of original image, and the pixel data of a first frame of sub-image in the at least part of sub-images to be displayed is determined by:

when it is determined that the first frame of sub-image is the first sub-image, determining the pixel data of the first frame of sub-image, according to:

a difference value between pixel values of the first sub-image and the second sub-image of the current frame of original image at a corresponding position, and a mean value of the backlight data of the first sub-image of the current frame of original image in each partition in the backlight assembly and the backlight data of the first sub-image of a previous frame of original image in the partition.

As an alternative embodiment, it is determined that the first frame of sub-image is the first sub-image, and the determining the pixel data of the first frame of sub-image includes:

determining the pixel data of the first frame of sub-image, according to a ratio of the difference value between the pixel values of the first sub-image and the second sub-image at the corresponding position to the mean value of the partition, where a pixel point at the corresponding position is located, in the backlight assembly.

As an alternative embodiment, the pixel data of the second sub-image is determined by:

determining the pixel data of the second sub-image, according to a ratio of each pixel value of the second sub-image to the backlight data of a corresponding partition in the backlight assembly.

As an alternative embodiment, a plurality of frames of original images are acquired and it is determined that a current frame of original image to be displayed is not a first frame of original image, and the pixel data of a first frame of sub-image in the at least part of sub-images to be displayed is determined by:

when it is determined that the first frame of sub-image is the second sub-image, determining the pixel data of the first frame of sub-image, according to a pixel value of the second sub-image of the current frame of original image, and a mean value of the backlight data of the second sub-image of the current frame of original image in each partition in the backlight assembly and the backlight data of the second sub-image of a previous frame of original image in the partition.

As an alternative embodiment, it is determined that the first frame of sub-image is the second sub-image, and the determining the pixel data of the first frame of sub-image includes:

determining the pixel data of the first frame of sub-image, according to a ratio of the pixel value of the second sub-image to the mean value of a corresponding partition in the backlight assembly.

As an alternative embodiment, a plurality of frames of original images are acquired and it is determined that a current frame of original image to be displayed is not a first frame of original image, and the second sub-image is determined by:

determining the second sub-image, according to a minimum value between a minimum pixel value among respective first sub-images of the current frame of original image at a corresponding position and a minimum pixel value among the respective first sub-images of a previous frame of original image at the corresponding position.

As an alternative embodiment, the plurality of first sub-images include an image R, an image G and an image B, and the sequentially displaying the at least some of sub-images in the plurality of frames of sub-images in the preset sequence includes:

sequentially displaying the plurality of frames of sub-images in a sequence of the second sub-image, the image R, the image G, and the image B.

As an alternative embodiment, the backlight data of each of the plurality of first sub-images and the second sub-image is determined by:

setting each of the backlight data of the first sub-image and the backlight data of the second sub-image to be a preset value.

As an alternative embodiment, the pixel data of each of the plurality of first sub-images is determined by:

determining a maximum difference value in each partition in the backlight assembly, according to a difference value between pixel values of the first sub-image and the second sub-image at a corresponding position; and determining the pixel data of the first sub-image, according to a ratio of the difference value corresponding to each pixel position in the first sub-image to the maximum difference value in the partition corresponding to the pixel position.

As an alternative embodiment, the pixel data of the second sub-image is determined by:

determining a maximum pixel value in each partition in the backlight assembly, according to respective pixel values in the second sub-image; and determining the pixel data of the second sub-image, according to a ratio of each pixel value in the second sub-image to the maximum pixel value in a corresponding partition.

In a second aspect, a field sequential display device according to an embodiment of the present disclosure includes a processor and a memory, where the memory is configured to store a program executable by the processor, and the processor in configured to read the program in the memory and execute the following steps:

acquiring an original image to be displayed, and determining a plurality of frames of sub-images each having a single channel according to the original image, where the plurality of frames of sub-images include a plurality of first sub-images and a second sub-image determined according to the plurality of first sub-images;

determining backlight data and pixel data of each of the plurality of frames of sub-images, where the backlight data serves to represent a brightness of each color contained in a backlight assembly, and the pixel data serves to represent a pixel value of each pixel unit; and sequentially displaying at least part of sub-images in the plurality of frames of sub-images, in a preset sequence, according to the backlight data and the pixel data of respective frames of sub-images, where the number of frames of displayed sub-images is greater than or equal to the number of channels of the original image, the backlight data of any one frame of displayed sub-image serves to drive the backlight assembly to emit light with all colors contained in the backlight assembly, and the backlight data of the sub-images except the any one frame of displayed sub-image serves to drive the backlight assembly to each time emit light with one color contained in the backlight assembly.

As an alternative embodiment, the at least part of sub-images to be displayed include the second sub-image, the backlight data of the second sub-image serves to drive the backlight assembly to emit light with all colors contained in the backlight assembly, and the backlight data of the sub-images except the second sub-image serves to drive the backlight assembly to each time emit light with one color contained in the backlight assembly.

As an alternative embodiment, the backlight data of a first frame of sub-image in the at least part of sub-images to be displayed serves to drive the backlight assembly to emit light with all colors contained in the backlight assembly, and the backlight data of subsequent frames of sub-images serves to drive the backlight assembly to each time emit light with one color contained in the backlight assembly.

As an alternative embodiment, the processor is configured to determine the first sub-image and the second sub-image by:

splitting the original image into a plurality of images each having a single channel, according to the number of channels of the original image, and determining the plurality of images each having a single channel as the plurality of first sub-images; and determining the second sub-image according to a minimum pixel value of the plurality of first sub-images at a corresponding position.

As an alternative embodiment, the plurality of first sub-images include an image R, an image G and an image B, and a plurality of frames of original images are acquired, the processor is configured to:

every displaying four frames of original images, sequentially display three sub-images of each frame of original image according to a following cyclic sequence:

when a first frame of original image is displayed, sequentially display three sub-images in a sequence of the second sub-image of the first frame of original image, the image R of the first frame of original image and the image G of the first frame of original image;

when a second frame of original image is displayed, sequentially display three sub-images in a sequence of the image B of the second frame of original image, the second sub-image of the second frame of original image and the image R of the second frame of original image;

when a third frame of original image is displayed, sequentially display three sub-images in a sequence of the image G of the third frame of original image, the image B of the third frame of original image and the second sub-image of the third frame of original image; and when a fourth frame of original image is displayed, sequentially display three sub-images in a sequence of the image R of the fourth frame of original image, the image G of the fourth frame of original image and the image B of the fourth frame of original image.

As an alternative embodiment, a plurality of frames of original images are acquired and it is determined that a current frame of original image to be displayed is not a first frame of original image, the processor is configured to determine the backlight data of a first frame of sub-image in the at least part of sub-images to be displayed by:

when it is determined that the first frame of sub-image is the first sub-image, determining the backlight data of the first frame of sub-image in each partition in the backlight assembly, according to a mean value of the backlight data of the first sub-image of the current frame of original image in the partition and the backlight data of the first sub-image of a previous frame of original image in the partition.

As an alternative embodiment, the processor is configured to determine the backlight data of each of the plurality of first sub-images by:

determining a maximum difference value in each partition in the backlight assembly, according to a difference value between pixel values of the first sub-image and the second sub-image at a corresponding position in the partition; and determining the backlight data of the first sub-image in each partition, according to the maximum difference value in the partition.

As an alternative embodiment, a plurality of frames of original images are acquired and it is determined that a current frame of original image to be displayed is not a first frame of original image, the processor is configured to determine the backlight data of a first frame of sub-image in the at least part of sub-images to be displayed by:

when it is determined that the first frame of sub-image is the second sub-image, determining the backlight data of the first frame of sub-image in each partition in the backlight assembly, according to a mean value of the backlight data of the second sub-image of the current frame of original image in the partition and the backlight data of the second sub-image of a previous frame of original image in the partition.

As an alternative embodiment, the processor is configured to determine the backlight data of the second sub-image by:

determining the backlight data of the second sub-image in each partition in the backlight assembly, according to a maximum value of pixel values of the second sub-image in the partition.

As an alternative embodiment, the processor is configured to determine the pixel data of each of the plurality of first sub-images by:

determining the pixel data of the first sub-image, according to a ratio of a difference value between pixel values of the first sub-image and the second sub-image at a corresponding position to the backlight data of a pixel point at the corresponding position in a partition in the backlight assembly.

As an alternative embodiment, a plurality of frames of original images are acquired and it is determined that a current frame of original image to be displayed is not a first frame of original image, the processor is configured to determine the pixel data of a first frame of sub-image in the at least part of sub-images to be displayed by:

when it is determined that the first frame of sub-image is the first sub-image, determining the pixel data of the first frame of sub-image, according to a difference value between pixel values of the first sub-image and the second sub-image of the current frame of original image at a corresponding position, and a mean value of the backlight data of the first sub-image of the current frame of original image in each partition in the backlight assembly and the backlight data of the first sub-image of a previous frame of original image in the partition.

As an alternative embodiment, it is determined that the first frame of sub-image is the first sub-image, and the processor is configured to perform:

determining the pixel data of the first frame of sub-image, according to a ratio of the difference value between the pixel values of the first sub-image and the second sub-image at the corresponding position to the mean value of a pixel point at the corresponding position in a partition in the backlight assembly.

As an alternative embodiment, the processor is configured to determine the pixel data of the second sub-image by:

determining the pixel data of the second sub-image, according to a ratio of each pixel value of the second sub-image to the backlight data of a corresponding partition in the backlight assembly.

As an alternative embodiment, a plurality of frames of original images are acquired and it is determined that a current frame of original image to be displayed is not a first frame of original image, the processor is configured to determine the pixel data of a first frame of sub-image in the at least part of sub-images to be displayed by:

when it is determined that the first frame of sub-image is the second sub-image, determining the pixel data of the first frame of sub-image, according to a pixel value of the second sub-image of the current frame of original image, and a mean value of the backlight data of the second sub-image of the current frame of original image in each partition in the backlight assembly and the backlight data of the second sub-image of a previous frame of original image in the partition.

As an alternative embodiment, it is determined that the first frame of sub-image is the second sub-image, and the processor is configured to perform:

determining the pixel data of the first frame of sub-image, according to a ratio of the pixel value of the second sub-image to the mean value of a corresponding partition in the backlight assembly.

As an alternative embodiment, a plurality of frames of original images are acquired and it is determined that a current frame of original image to be displayed is not a first frame of original image, and the processor is configured to determine the second sub-image by:

determining the second sub-image, according to a minimum value between a minimum pixel value among respective first sub-images of the current frame of original image at a corresponding position and a minimum pixel value among the respective first sub-images of a previous frame of original image at the corresponding position.

As an alternative embodiment, the plurality of first sub-images include an image R, an image G and an image B, and the processor is configured to perform:

sequentially displaying the plurality of frames of sub-images in a sequence of the second sub-image, the image R, the image G, and the image B.

As an alternative embodiment, the processor is configured to determine the backlight data of each of the plurality of first sub-images and the second sub-image by:

setting each of the backlight data of the first sub-image and the backlight data of the second sub-image to be a preset value.

As an alternative embodiment, the processor is configured to determine the pixel data of each of the plurality of first sub-images by:

determining a maximum difference value in each partition in the backlight assembly, according to a difference value between pixel values of the first sub-image and the second sub-image at a corresponding position; and determining the pixel data of the first sub-image, according to a ratio of the difference value corresponding to each pixel position in the first sub-image to the maximum difference value in the partition corresponding to the pixel position.

As an alternative embodiment, the processor is configured to determine the pixel data of the second sub-image by:

determining a maximum pixel value in each partition in the backlight assembly, according to respective pixel values in the second sub-image; and determining the pixel data of the second sub-image, according to a ratio of each pixel value in the second sub-image to the maximum pixel value in a corresponding partition.

In a third aspect, an embodiment of the present disclosure further provides an apparatus for displaying while inhibiting color separation, including:

a sub-image acquiring unit, configured to acquire an original image to be displayed, and determine a plurality of frames of sub-images each having a single channel according to the original image, where the plurality of frames of sub-images include a plurality of first sub-images and a second sub-image determined according to the plurality of first sub-images;

a backlight and pixel determining unit, configured to determine backlight data and pixel data of each of the plurality of frames of sub-images, where the backlight data serves to represent a brightness of each color contained in a backlight assembly, and the pixel data serves to represent a pixel value of each pixel unit; and a sub-image display unit, configured to sequentially display at least part of sub-images in the plurality of frames of sub-images, in a preset sequence, according to the backlight data and the pixel data of respective frames of sub-images, where the number of frames of displayed sub-images is greater than or equal to the number of channels of the original image, the backlight data of any one frame of displayed sub-image serves to drive the backlight assembly to emit light with all colors contained in the backlight assembly, and the backlight data of the sub-images except the any one frame of displayed sub-image serves to drive the backlight assembly to each time emit light with one color contained in the backlight assembly.

As an alternative embodiment, the at least part of sub-images to be displayed include the second sub-image, the backlight data of the second sub-image serves to drive the backlight assembly to emit light with all colors contained in the backlight assembly, and the backlight data of the sub-images except the second sub-image serves to drive the backlight assembly to each time emit light with one color contained in the backlight assembly.

As an alternative embodiment, the backlight data of a first frame of sub-image in the at least part of sub-images to be displayed serves to drive the backlight assembly to emit light with all colors contained in the backlight assembly, and the backlight data of subsequent frames of sub-images serves to drive the backlight assembly to each time emit light with one color contained in the backlight assembly.

As an alternative embodiment, the sub-image acquiring unit is specifically configured to determine the plurality of first sub-images and the second sub-image by:

splitting the original image into a plurality of images each having a single channel, according to the number of channels of the original image, and determining the plurality of images each having a single channel as the plurality of first sub-images; and determining the second sub-image according to a minimum pixel value of the plurality of first sub-images at a corresponding position.

As an alternative embodiment, the plurality of first sub-images include an image R, an image G, and an image B, and a plurality of frames of original images are acquired, the sub-image display unit is specifically configured to:

every displaying four frames of original images, sequentially display three sub-images of each frame of original image according to a following cyclic sequence:

when a first frame of original image is displayed, sequentially display three sub-images in a sequence of the second sub-image of the first frame of original image, the image R of the first frame of original image and the image G of the first frame of original image;

when a second frame of original image is displayed, sequentially display three sub-images in a sequence of the image B of the second frame of original image, the second sub-image of the second frame of original image and the image R of the second frame of original image;

when a third frame of original image is displayed, sequentially display three sub-images in a sequence of the image G of the third frame of original image, the image B of the third frame of original image and the second sub-image of the third frame of original image; and when a fourth frame of original image is displayed, sequentially display three sub-images in a sequence of the image R of the fourth frame of original image, the image G of the fourth frame of original image and the image B of the fourth frame of original image.

As an alternative embodiment, a plurality of frames of original images are acquired and it is determined that a current frame of original image to be displayed is not a first frame of original image, the backlight and pixel determining unit is specifically configured to determine the backlight data of a first frame of sub-image in the at least part of sub-images to be displayed by:

when it is determined that the first frame of sub-image is the first sub-image, determining the backlight data of the first frame of sub-image in each partition in the backlight assembly, according to a mean value of the backlight data of the first sub-image of the current frame of original image in the partition and the backlight data of the first sub-image of a previous frame of original image in the partition.

As an alternative embodiment, the backlight and pixel determining unit is specifically configured to determine the backlight data of the first sub-image by:

determining a maximum difference value in each partition in the backlight assembly, according to a difference value between pixel values of the first sub-image and the second sub-image at a corresponding position in the partition; and determining the backlight data of the first sub-image in each partition, according to the maximum difference value in the partition.

As an alternative embodiment, a plurality of frames of original images are acquired and it is determined that a current frame of original image to be displayed is not a first frame of original image, the backlight and pixel determining unit is specifically configured to determine the backlight data of a first frame of sub-image in the at least part of sub-images to be displayed by:

when it is determined that the first frame of sub-image is the second sub-image, determining the backlight data of the first frame of sub-image in each partition in the backlight assembly, according to a mean value of the backlight data of the second sub-image of the current frame of original image in the partition and the backlight data of the second sub-image of a previous frame of original image in the partition.

As an alternative embodiment, the backlight and pixel determining unit is specifically configured to determine the backlight data of the second sub-image by:

determining the backlight data of the second sub-image in each partition in the backlight assembly, according to a maximum value of pixel values of the second sub-image in the partition.

As an alternative embodiment, the backlight and pixel determining unit is specifically configured to determine the pixel data of each of the plurality of first sub-images by:

determining the pixel data of the first sub-image, according to a ratio of a difference value between pixel values of the first sub-image and the second sub-image at a corresponding position to the backlight data of a pixel point at the corresponding position in a partition in the backlight assembly.

As an alternative embodiment, a plurality of frames of original images are acquired and it is determined that a current frame of original image to be displayed is not a first frame of original image, the backlight and pixel determining unit is specifically configured to determine the pixel data of a first frame of sub-image in the at least part of sub-images to be displayed by:

when it is determined that the first frame of sub-image is the first sub-image, determining the pixel data of the first frame of sub-image, according to a difference value between pixel values of the first sub-image and the second sub-image of the current frame of original image at a corresponding position, and a mean value of the backlight data of the first sub-image of the current frame of original image in each partition in the backlight assembly and the backlight data of the first sub-image of a previous frame of original image in the partition.

As an alternative embodiment, it is determined that the first frame of sub-image is the first sub-image, and the backlight and pixel determining unit is specifically configured to:

determine the pixel data of the first frame of sub-image, according to a ratio of the difference value between the pixel values of the first sub-image and the second sub-image at the corresponding position to the mean value of a pixel point at the corresponding position in a partition in the backlight assembly.

As an alternative embodiment, the backlight and pixel determining unit is specifically configured to determine the pixel data of the second sub-image by:

determining the pixel data of the second sub-image, according to a ratio of each pixel value of the second sub-image to the backlight data of a corresponding partition in the backlight assembly.

As an alternative embodiment, a plurality of frames of original images are acquired and it is determined that a current frame of original image to be displayed is not a first frame of original image, the backlight and pixel determining unit is specifically configured to determine the pixel data of a first frame of sub-image in the at least part of sub-images to be displayed by:

when it is determined that the first frame of sub-image is the second sub-image, determining the pixel data of the first frame of sub-image, according to a pixel value of the second sub-image of the current frame of original image, and a mean value of the backlight data of the second sub-image of the current frame of original image in each partition in the backlight assembly and the backlight data of the second sub-image of a previous frame of original image in the partition.

As an alternative embodiment, it is determined that the first frame of sub-image is the second sub-image, and the backlight and pixel determining unit is specifically configured to:

determine the pixel data of the first frame of sub-image, according to a ratio of the pixel value of the second sub-image to the mean value of a corresponding partition in the backlight assembly.

As an alternative embodiment, a plurality of frames of original images are acquired and it is determined that a current frame of original image to be displayed is not a first frame of original image, the sub-image acquiring unit is specifically configured to determine the second sub-image by:

determining the second sub-image, according to a minimum value between a minimum pixel value among respective first sub-images of the current frame of original image at a corresponding position and a minimum pixel value among the respective first sub-images of a previous frame of original image at the corresponding position.

As an alternative embodiment, the plurality of first sub-images include an image R, an image G, and an image B, and the sub-image display unit is specifically configured to:

sequentially display the plurality of frames of sub-images in a sequence of the second sub-image, the image R, the image G, and the image B.

As an alternative embodiment, the backlight and pixel determining unit is specifically configured to determine the backlight data of each of the plurality of first sub-images and the second sub-image by:

setting each of the backlight data of the first sub-image and the backlight data of the second sub-image to be a preset value.

As an alternative embodiment, the backlight and pixel determining unit is specifically configured to determine the pixel data of each of the plurality of first sub-images by:

determining a maximum difference value in each partition in the backlight assembly, according to a difference value between pixel values of the first sub-image and the second sub-image at a corresponding position; and determining the pixel data of the first sub-image, according to a ratio of the difference value corresponding to each pixel position in the first sub-image to the maximum difference value in the partition corresponding to the pixel position.

As an alternative embodiment, the backlight and pixel determining unit is specifically configured to determine the pixel data of the second sub-image by:

determining a maximum pixel value in each partition in the backlight assembly, according to respective pixel values in the second sub-image; and determining the pixel data of the second sub-image, according to a ratio of each pixel value in the second sub-image to the maximum pixel value in a corresponding partition.

In a fourth aspect, an embodiments of the present disclosure further provides a computer storage medium storing a computer program which, when executed by a processor, causes the processor to perform steps of the method in the first aspect.

These and other aspects of the present disclosure will be more readily apparent in the following description of the embodiments.

BRIEF DESCRIPTION OF DRAWINGS

In order to explain the technical solutions in the embodiments of the present disclosure more clearly, the drawings to be used in the description of the embodiments will be briefly described below. Apparently, the drawings in the following description are merely some embodiments of the present disclosure, and other drawings may be derived from these drawings by those skilled in the art without any creative labor.

DETAIL DESCRIPTION OF EMBODIMENTS

Figure 1:
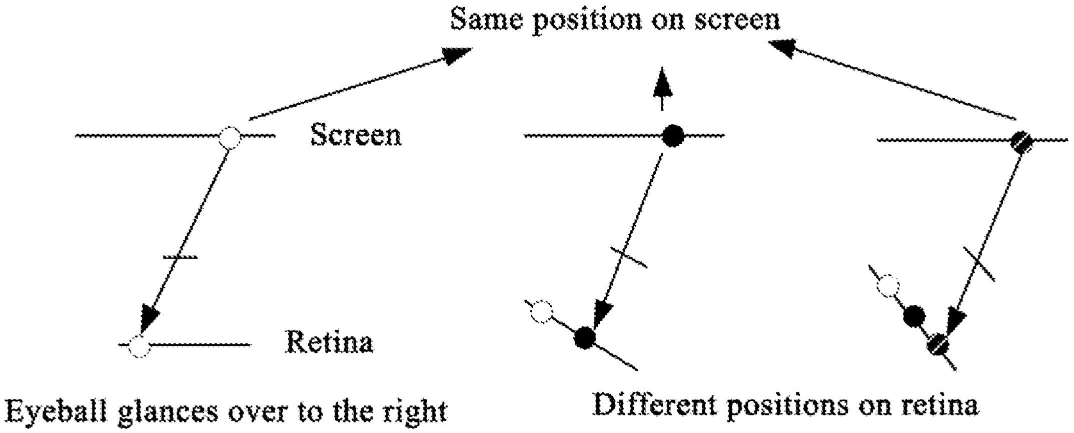
FIG. 1 is a schematic diagram illustrating a reason for color separation according to an embodiment of the present disclosure.

To make the objects, technical solutions and advantages of the present disclosure more apparent, the present disclosure will be further described in detail below with reference to the drawings. Apparently, the described embodiments are merely some, but not all, of the embodiments of the present disclosure. All other embodiments obtained by those skilled in the art based on the embodiments of the present disclosure described herein without paying any creative effort shall be included in the protection scope of the present disclosure.

The term "and/or" in the embodiments of the present disclosure describes an association relationship between associated objects, and indicates that three relationships may exist. For example, A and/or B may indicate: A exists alone, A and B exist simultaneously, and B exists alone. The character "/" generally indicates that the associated objects before and after the character "/" are in an "or" relationship.

The term "refresh rate" in the embodiments of the present disclosure refers to the number of times the electron beam repeatedly scans an image on the screen. The higher the refresh rate is, the better the stability of the displayed image (picture) is. The refresh rate and the resolution are mutually restricted, and the performance of the display which achieves the high refresh rate under the high resolution is better.

The application scene described in the embodiments of the present disclosure is for more clearly illustrating the technical solution of the embodiment of the present disclosure, and does not form a limitation on the technical solution according to the embodiment of the present disclosure. As those skilled in the art know, with the occurrence of a new application scene, the technical solution according to the embodiment of the present disclosure is also applicable to similar technical problems. In the description of the present disclosure, the meaning of "a plurality" is two or more, unless otherwise specified.

Embodiment 1, a conventional LCD (Liquid Crystal Display) screen generally includes a backlight and a panel (liquid crystal panel), where the backlight uses a white normally-bright mode, and the purpose of displaying a picture is achieved by controlling the deflection of the Liquid Crystal of the panel. Different from the conventional LCD screen, a backlight of a field sequential display device is composed of a plurality of partitions, each partition includes m×n pixels, and the backlight of each partition is composed of three types of LEDs (Light Emitting diodes), i.e., red, green, and blue LEDs, so that the backlight can display three colors and the brightness of each color can be adjusted. In addition, unlike the traditional LCD panel controlled by RGB three liquid crystal sub-pixels, a pixel of the field sequential panel has only one hole controlled by the liquid crystal, and can display only gray scale images.

A field sequential color display is a novel color display mode, which, compared with the conventional space color technology, avoids the use of color filters, has the advantages of high light source efficiency, high resolution, low cost and the like, and can be applied to aspects of direct-view display, projection display, helmet display and the like. However, in the field sequential color display, due to rotation of an eye, a viewer may often perceive color separation at an edge of a displayed object, i.e., a color separation phenomenon. In field sequential color display, a color separation phenomenon is caused by a field sequential display mechanism, where each frame of image is divided into three primary color fields to be displayed according to a time sequence, so that time difference exists in RGB components of the same image, when human eyeball rotates, a landing point of the RGB components on the retina is shifted, and human eyes may perceive the color separation.

Figure 2:
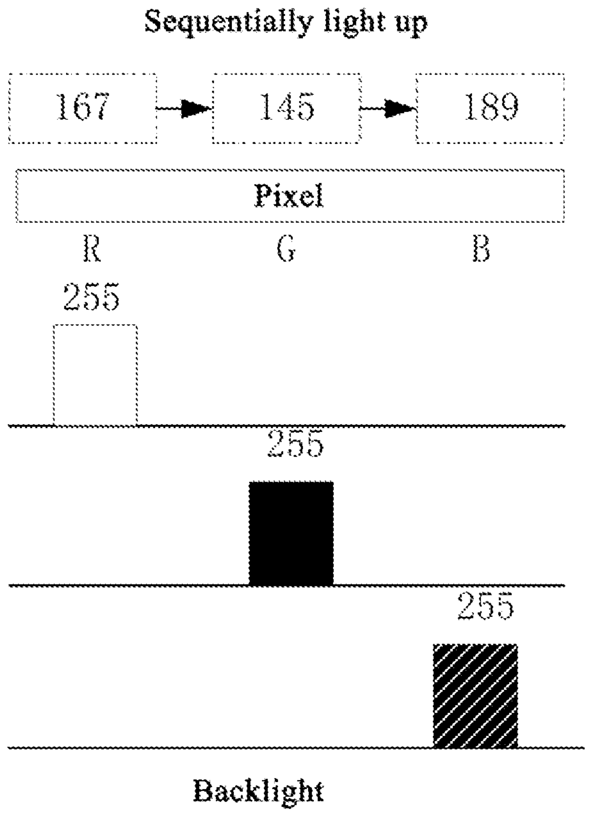
FIG. 2 is a schematic diagram illustrating an RGB display scheme of a current field sequential display device according to an embodiment of the present disclosure.
Figure 3A:
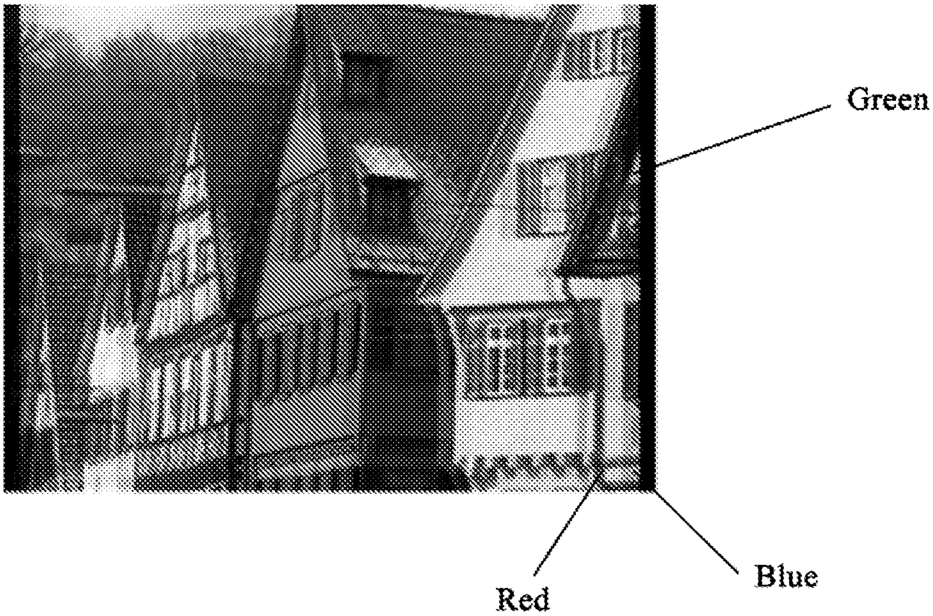
FIG. 3A is a picture of a scene with color separation according to an embodiment of the present disclosure.
Figure 3B:
FIG. 3B is a picture of a scene with color separation inhibited according to an embodiment of the disclosure.

For the VR display screen, the user can have an immersive sensation only when the frame refresh rate reaches 90 Hz, and when the field sequential screen serves as the VR screen, the refresh rate is required to reach 270 HZ in order to ensure the above effect. When a field sequential screen is used for displaying, an original frame of RGB image is required to be split into R, G, B three sub-frames for displaying, and as an eyeball moves, R, G, B three sub-frames at a certain position on screen fall at different positions of the retina of the human eye, respectively, so that the human perceives the color separation phenomenon. As shown in FIG. 1, this embodiment provides a schematic diagram illustrating a reason for color separation. When the eyeball rotates, three sub-frames sequentially scanned by a field sequential device fall at different positions of the retina, respectively, to generate the color separation phenomenon. It is found when analyzing the scene where color separation occurs, that the color separation phenomenon is more likely to occur as the difference of the three "sub-frames" is larger. As shown in FIG. 2, this embodiment provides an RGB display scheme of a current field sequential display device. Taking a certain area in the original image as an example, three sub-frames (R, G, B) all display (255, 255, 255), and if the eyeball glances over at this moment, the color separation phenomenon is most easily to generate. Since the red sub-frame, the green sub-frame, the blue sub-frame each have their maximum pixel values, the human eye can perceive the three colors more clearly. As the eye rotates, the color separation phenomenon perceived by the human eye becomes more pronounced. As shown in FIG. 3A, this embodiment provides a picture of a scene with color separation. It can be seen from the picture that when the color separation phenomenon occurs, three color stripes of red, green, and blue can be clearly seen on the window frame. As shown in FIG. 3B, this embodiment provides a picture of a scene with color separation inhibited. It can be seen from the picture that after the color separation is inhibited, the part with color separation is black, to reduce the perception of human eyes on color and brightness, thereby effectively improving the color separation phenomenon.

In order to effectively inhibit the color separation phenomenon caused by the display mechanism of the field sequential display device, this embodiment provides a method of displaying while inhibiting color separation, which can be applied to a field sequential display device. The core idea is to split an original image into a plurality of frames for display, drive the backlight assembly to emit light with all colors of the backlight of the field sequential display device when any one frame of sub-image is displayed, and drive the backlight assembly to emit light with one color of the backlight each time when the sub-images of the rest frames are sequentially displayed, thereby effectively reducing the color and brightness difference value between a plurality of frames of sub-images during display, reducing the perception of human eyes on the color of the subsequent frames, and effectively inhibiting the color separation phenomenon.

It should be noted that the method of displaying while inhibiting color separation according to this embodiment is designed based on the display mechanism of the field sequential display device, may be applied to, but is not limited to the field sequential display device, and may also be applied to other display devices to eliminate the color separation phenomenon, which is not excessively limited in this embodiment.

Figure 4:
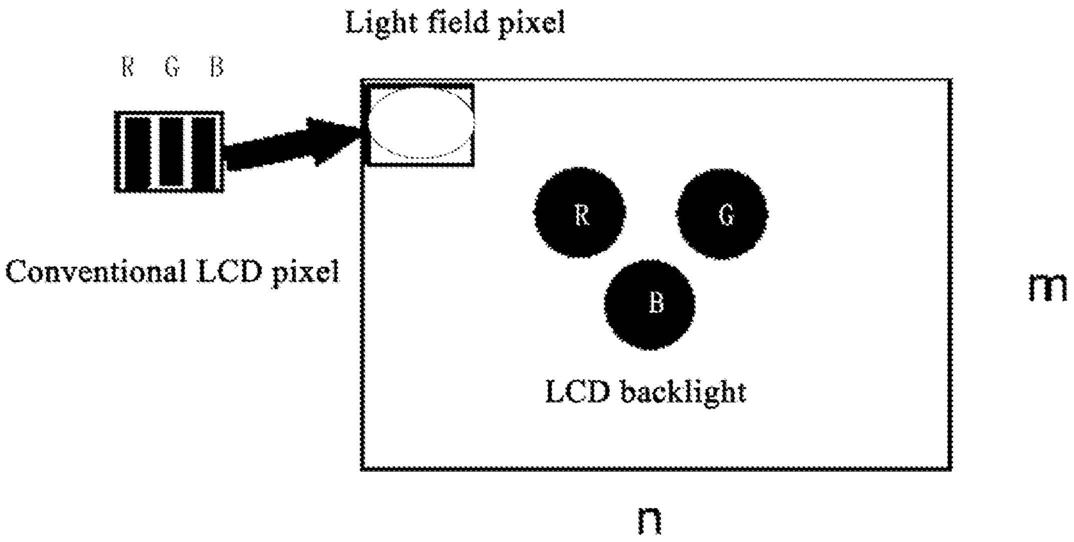
FIG. 4 is a schematic diagram illustrating a backlight partition of a field sequential display device according to an embodiment of the present disclosure.

In implementation, as shown in FIG. 4, this embodiment provides a schematic diagram illustrating a backlight partition of a field sequential display device. Since a backlight of the field sequential display device is composed of a plurality of partitions, each partition includes m×n pixels, the backlight of each partition is composed of three types of (Light Emitting diodes), i.e., red, green, and blue LEDs, and the brightness can also be adjusted. Before an original image is displayed by the field sequential display device, the original image is required to be split into sub-images each having a single channel, then the sub-images are sequentially displayed according to the display sequence of the plurality of frames of sub-images based on a field sequential color display mode, and the backlight is lit up when each sub-image is displayed. Taking an RGB image as an example, each frame is divided into R, G, B sub-frames to sequentially scan and turn on the backlight of one color each time, and the backlight of three colors of RGB are sequentially lit up. In order to eliminate the color separation phenomenon, this embodiment splits the original image into a plurality of frames, lights up the backlight of all colors for any one frame of sub-image, and lights up the backlight of one corresponding color for each of the rest frames of sub-image, eliminating the color separation by reducing the perception of the eye to the color brightness of the rest frames.

Figure 5:
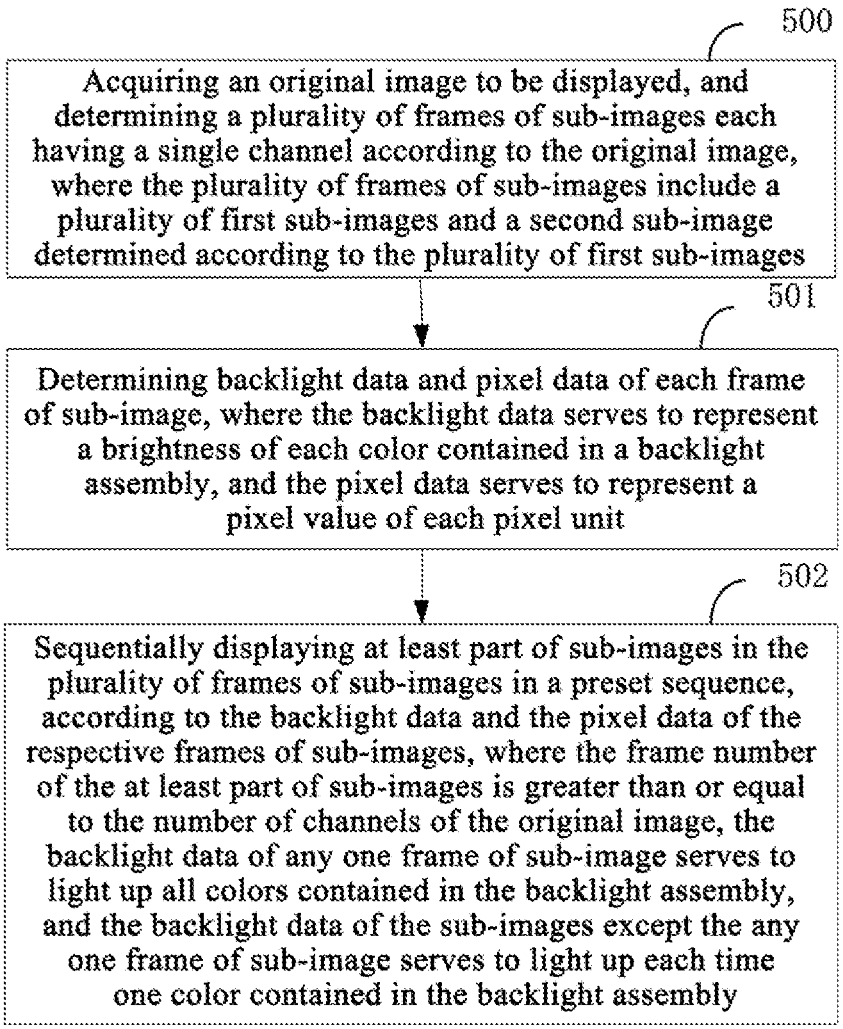
FIG. 5 is a flowchart illustrating an implementation of a method of displaying while inhibiting color separation according to an embodiment of the present disclosure.

As shown in FIG. 5, this embodiment provides an implementation process of a method of displaying while inhibiting color separation. A specific implementation of the process includes steps 500 to 502.

At the step 500, an original image to be displayed is acquired and a plurality of frames of sub-images each having a single channel are determined according to the original image, where the plurality of frames of sub-images include a plurality of first sub-images and a second sub-image determined according to the plurality of first sub-images.

In some embodiments, the acquired original image is a multi-channel image, and the original image includes, but is not limited to, an RGB image, an HSV image, a CMYK image, and the like, which is not excessively limited in the embodiments.

Taking an RGB image as an example, this embodiment splits the original image into a plurality of frames of sub-images each having a single channel, where each frame of sub-image is a gray scale image, and pixel values of each frame of sub-image are gray scale values of each gray scale image. Optionally, the number of the sub-images obtained by splitting in this embodiment is greater than the number of channels of the original image. In this embodiment, the first sub-image is obtained by splitting based on the number of channels of the original image, and the second sub-image is generated according to the plurality of first sub-images.

In some embodiments, the first sub-image and the second sub-image are determined by:

splitting the original image into a plurality of images each having a single channel according to the number of channels of the original image, and determining the images each having a single channel as first sub-images; and determining the second sub-image according to a minimum pixel value of the plurality of first sub-images at a corresponding position.

Figure 6:
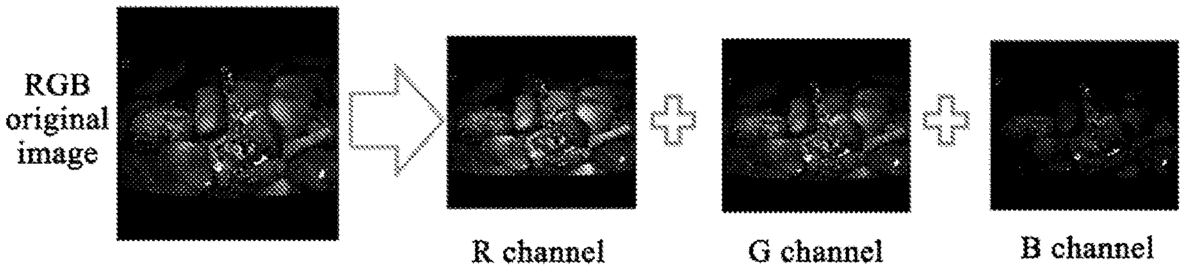
FIG. 6 is a schematic diagram illustrating splitting an original image according to an embodiment of the present disclosure.

In implementation, the original image is split into N images each having a single channel according to the number N of channels of the original image, where N is greater than or equal to 3. Taking an RGB original image as an example, as shown in FIG. 6, this embodiment provides a schematic diagram illustrating how to split the original image. The original image is split into R, G, B first sub-images, and the second sub-image is determined according to the minimum pixel values of the first sub-image R, the first sub-image G, and the first sub-image B at respective positions. That is, the minimum pixel values at respective the same positions in the first sub-image R, the first sub-image G, and the first sub-image B are extracted to form the second sub-image. The minimum pixel value in this embodiment refers to the minimum gray-scale value at the corresponding position in each of the three first sub-images.

In this embodiment, the first sub-image and the second sub-image are both gray-scale images, and the color original image is finally displayed through the colors of the backlight and the gray-scale images of respective frames of sub-images.

At the step 501, backlight data and pixel data of each frame of sub-image are determined, where the backlight data serves to represent a brightness of each color contained in a backlight assembly, and the pixel data serves to represent a pixel value of each pixel unit.

It should be noted that the backlight of the field sequential display device includes a plurality of partitions, each partition includes m×n pixels (units), the backlight of each partition is composed of three types of LEDs, i.e., red, green, and blue LEDs, and a brightness of the backlight is adjustable. The first sub-image and the second sub-image in this embodiment are used as the gray scale images input to the panel, the backlight data serves as the brightness of each color in the backlight of each gray scale image, and the pixel data represents the pixel value of each pixel in each gray scale image to be displayed. The backlight data of respective frames of sub-images are different from each other.

Since the backlight includes a plurality of partitions, the backlight data in this embodiment includes the backlight data of each partition, where the backlight of each partition may be different or the same, which is not excessively limited in this embodiment. The pixel data is not equivalent to the pixel value in each gray scale image, but the pixel data is determined based on the pixel value.

At the step 502, at least part of sub-images in the plurality of frames of sub-images are sequentially displayed in a preset sequence, according to the backlight data and the pixel data of the respective frames of sub-images, where the number of the displayed sub-images is greater than or equal to the number of channels of the original image, the backlight data of any one frame of sub-image serves to drive the backlight assembly to emit light with all colors contained in the backlight assembly, and the backlight data of the sub-images except the any one frame of sub-image serves to drive the backlight assembly to each time emit light with one color contained in the backlight assembly.

In some embodiments, when the at least part of sub-images in the plurality of frames of sub-images sequentially displayed in the preset sequence, according to the backlight data and the pixel data of the respective frames of sub-image, include the second sub-image, the backlight data of the displayed second sub-image serves to drive the backlight assembly to emit light with all colors contained in the backlight assembly, and the backlight data of the sub-images except the second sub-image serves to drive the backlight assembly to each time emit light with one color contained in the backlight assembly.

In implementation, when the sub-images corresponding to respective frames of original images are sequentially displayed according to a predetermined cyclic display sequence, for example, according to XRG-BXR-GBX-RGB, the backlight data of the second sub-image corresponding to the displayed first frame of original image serves to drive the backlight assembly to emit light with all colors of the backlight assembly, and the backlight data of the first sub-images corresponding to the displayed first frame of original image serves to drive the backlight assembly to each time emit light with one color contained in the backlight assembly; the backlight data of the second sub-image corresponding to the displayed second frame of original image serves to drive the backlight assembly to emit light with all colors of the backlight assembly, and the backlight data of the first sub-images corresponding to the displayed second frame of original image serves to drive the backlight assembly to each time emit light with one color contained in the backlight assembly; similarly, the backlight data of the second sub-image corresponding to the displayed third frame of original image serves to drive the backlight assembly to emit light with all colors of the backlight assembly, and the backlight data of the first sub-images corresponding to the displayed third frame of original image serves to drive the backlight assembly to each time emit light with one color contained in the backlight assembly.

In some embodiments, it may alternatively provide the following manner for eliminating the color separation phenomenon:

in the at least part of sub-images to be displayed, the backlight data of the first frame of sub-image serves to drive the backlight assembly to emit light with all colors contained in the backlight assembly, and the backlight data of the subsequent frames of sub-images serves to drive the backlight assembly to each time emit light with one color contained in the backlight assembly. The first frame of sub-image lights up all colors of backlight, the subsequent frames of sub-images each drive the backlight assembly to emit light with one color of backlight only, and the color separation phenomenon is eliminating by reducing the perception of eyes to color brightness of the subsequent frames.

It should be noted that, in this embodiment, the number of frames of the sub-images determined according to the original image is greater than the number of channels of the original image. Therefore, when displaying, one display mode is to display all the sub-images, and the other mode is to display part of the sub-images, and finally display all the sub-images in a cycle period through a cycle display mode. The specific display modes are described below.

In the first display mode, one frame of original image corresponds to displaying three frames of sub-images.

In implementation, each time an RGB original image is displayed, three frames of sub-images of the original image are displayed. Taking an original image being an RGB image as an example, pixel values of R, G, B channels of the original image are extracted, to obtain three first sub-images, namely an image R, an image G and an image B; a second sub-image is generated according to a minimum pixel value of the image R, the image G and the image B at a corresponding position.

When a plurality of frames of original images are acquired, at least part of sub-images in a plurality of frames of sub-images are sequentially displayed according to a preset sequence in the following way, where every four frames of original images are displayed as a cycle period.

When every four frames of original images are displayed, three sub-images of each frame of original image are sequentially displayed according to the following cyclic sequence:

1) When the first frame of original image is displayed, sequentially displaying three sub-images in a sequence of a second sub-image of the first frame of original image, an image R of the first frame of original image and an image G of the first frame of original image;
2) When the second frame of original image is displayed, sequentially displaying three sub-images in a sequence of an image B of the second frame of original image, a second sub-image of the second frame of original image and an image R of the second frame of original image;
3) When the third frame of original image is displayed, sequentially displaying three sub-images in a sequence of an image G of the third frame of original image, an image B of the third frame of original image and a second sub-image of the third frame of original image; and
4) When the fourth frame of original image is displayed, sequentially displaying three sub-images in a sequence of an image R of the fourth frame of original image, an image G of the fourth frame of original image and an image B of the fourth frame of original image.

It should be noted that, in this embodiment, the display is performed in the sequence of the second sub-image (assumed to be X), the image R, the image G, and the image B, every three sub-images are displayed once, and then three sub-images are continuously displayed in the sequence of shifting one sub-image to the left, and the sequence of the cyclic display is XRG-BXR-GBX-RGB. Based on this principle of display, the display in other sequences also belongs to the protection scope of the present disclosure, for example, the cyclic display is performed in the sequence of the image R, the image G, the image B, and the second sub-image, and the sequence of the cyclic display is RGB-XRG-BXR-GBX, where the cyclic display of the sub-images can be completed every four frames of original images. Displaying three sub-images of the original image each time further includes other display sequences, for example, displaying every three sub-image, and then continuously displaying three sub-images in a sequence of shifting one sub-image to the right, or displaying in other defined manners, which all belong to the protection scope of the present disclosure, and are not listed one by one herein.

It should be noted that, when the field sequential display device serves as the VR screen, since the user can have an immersive sensation only when the frame refresh rate reaches 90 Hz, if the field sequential display device displays one frame of original image with three frames of sub-images, in order to ensure the VR display effect, the backlight and the panel of the field sequential display device are required to operate at the refresh rate of 3×90=270 frames.

In the second display mode, one frame of original image corresponds to displaying four sub-images.

In implementation, each time an RGB original image is displayed, four frames of sub-images of the original image are displayed. Taking an original image being an RGB image as an example, pixel values of R, G, B channels of the original image are extracted to obtain three first sub-images, namely an image R, an image G and an image B; a second sub-image is generated according to a minimum pixel value of the image R, the image G and the image B at a corresponding position.

All sub-images in a frame of original image are sequentially displayed according to a preset sequence as follows:

sequentially displaying the plurality of frames of sub-images in a sequence of the second sub-image, the image R, the image G, and the image B.

It should be noted that, in this embodiment, the display is performed in the sequence of the second sub-image, the image R, the image G, and the image B. Based on this principle of display, the display in other sequences also belongs to the protection scope of the present disclosure. For example, the display is performed in a sequence of the image R, the image G, the image B, and the second sub-image, or in other display sequences, which are not listed one by one herein.

It should be noted that, when the field sequential display device serves as the VR screen, since the user can have an immersive sensation only when the frame refresh rate reaches 90 Hz, if the field sequential display device displays one frame of original image with four frames of sub-images, in order to ensure the VR display effect, the backlight and the panel of the field sequential display device are required to operate at the refresh rate of 4×90=360 frames.

In some embodiments, the backlight data represents a brightness value of the backlight in each partition. In the at least part of sub-images to be displayed, the brightness values of three colors contained in the backlight of the first frame of sub-image are the same, and the brightness value of one color contained in the backlight of each of the subsequent frames of sub-images may be calculated according to the pixel values of the sub-images. Alternatively, the backlight data in this embodiment is a preset value.

As can be seen from the manner of displaying a plurality of frames of sub-images, the first frame of displayed sub-image of the original image may be the first sub-image or the second sub-image, which is determined according to practical requirements.

In some embodiments, when calculating the backlight data of each frame of sub-image of the current frame of original image, the backlight data of each frame of sub-image of a previous frame of original image may be referred to, to improve the viewing experience as much as possible by reducing the color difference value between a plurality of frames of original images. If the current frame of original image to be displayed is the first frame of original image, the backlight data in the first frame of original image may be set as a preset value without referring to a previous frame of original image, or the backlight data may be determined according to the pixel values in respective frames of sub-images of the first frame of original image.

In some embodiments, when a plurality of frames of original images are acquired and it is determined that a current frame of original image to be displayed is not a first frame of original image, backlight data of a first frame of sub-image in the at least part of sub-images to be displayed is determined by the following steps (1) and (2).

(1) When it is determined that the first frame of sub-image is the first sub-image, determining the backlight data of the first frame of sub-image in each partition in the backlight assembly, according to a mean value of the backlight data of the first sub-image of the current frame of original image in the partition and the backlight data of the first sub-image of a previous frame of original image in the partition.

The backlight data of various positions of each partition is equal. In implementation, the backlight data of each partition of the first sub-image of the current frame of original image in the backlight assembly and the backlight data of the partition of the first sub-image of the previous frame of original image are calculated, then the two backlight data in the same partition are averaged to obtain the backlight data of the partition, and the backlight data serves as the backlight data of the first frame of sub-image.

(2) When it is determined that the first frame of sub-image is the second sub-image, determining the backlight data of the first frame of sub-image in each partition in the backlight assembly, according to a mean value of the backlight data of the second sub-image of the current frame of original image in the partition and the backlight data of the second sub-image of the previous frame of original image in the partition.

In implementation, the backlight data of each partition of the second sub-image of the current frame of original image in the backlight assembly and the backlight data of the partition of the second sub-image of the previous frame of original image are calculated, then the two backlight data in the same partition are averaged to obtain the backlight data of the partition, and the backlight data serves as the backlight data of the first frame of sub-image.

In some embodiments, the backlight data of the first sub-image corresponding to each frame of original image is calculated by the following method, where the first sub-image of the current frame of original image (not the first frame of original image), the first sub-image of the previous frame of original image, and the first sub-image of the first frame of original image all can be calculated by the following method to obtain the respective backlight data.

The following steps are executed for a first sub-image and a second sub-image in each frame of original image:

determining a maximum difference value in each partition in the backlight assembly, according to difference values between the pixel values of the first sub-image and the second sub-image at a corresponding position in the partition; and determining the backlight data of the first sub-image in each partition, according to the maximum difference value in the partition.

In implementation, the difference value between the pixel values of the first sub-image and the second sub-image at the corresponding position in each partition is calculated, the maximum difference value between the pixel values in the partition (i.e., the maximum difference value) is screened out, and then the maximum difference value in the partition serves as the backlight data (i.e., the backlight brightness) of the partition.

In some embodiments, the backlight data of the second sub-image corresponding to each frame of original image is calculated by the following method, where the second sub-image of the current frame of original image (not the first frame of original image), the second sub-image of the previous frame of original image, and the second sub-image of the first frame of original image all can be calculated by the following method to obtain the respective backlight data.

The following step is executed for a second sub-image in each frame of original image:

determining backlight data of the second sub-image in each partition in the backlight assembly, according to the maximum value of the pixel values of the second sub-image in the partition.

In implementation, the backlight data of the second sub-image is calculated with the maximum pixel value of the second sub-image in each partition, and the maximum pixel value (i.e. the maximum value) in the partition is taken as the backlight data (i.e. the backlight brightness) of the corresponding partition.

In some embodiments, when calculating the pixel data of each sub-image corresponding to the current frame of original image, calculation may be performed according to only respective frames of sub-images of the current frame of original image, or may also refer to respective frames of sub-image of a previous adjacent frame of original image, which is not excessively limited in the embodiments.

In some embodiments, for each frame of original image, the pixel data of the first sub-image corresponding to the frame of original image may be determined by:

determining the pixel data of the first sub-image, according to a ratio of the difference value between the pixel values of the first sub-image and the second sub-image at a corresponding position to the backlight data of a pixel point at the corresponding position in the partition in the backlight assembly.

In implementation, the difference value between the pixel values of the first sub-image and the second sub-image of the frame of original image at a corresponding position (a position of the same pixel) is calculated first. That is, the difference value between the pixel values of the first sub-image and the second sub-image is calculated at each pixel position of the original image, and at this time, each pixel position corresponds to one difference value. Then, backlight data of the partition in the backlight assembly, where the pixel point on each pixel position is located, is calculated. Finally, the ratio of the difference value at each pixel position to the backlight data of the corresponding partition is calculated, to obtain the ratio at each pixel position, and the ratio at each pixel position is determined as the pixel data of the first sub-image.

In some embodiments, for each frame of original image, the pixel data of the second sub-image corresponding to the frame of original image may be determined by:

determining the pixel data of the second sub-image, according to a ratio of each pixel value of the second sub-image to the backlight data of the corresponding partition in the backlight assembly.

In implementation, each pixel value of the second sub-image and the backlight data of the partition in the backlight assembly corresponding to the pixel value are determined, the ratio of each pixel value to the backlight data of the corresponding partition is calculated, and the ratio at each pixel position is determined as the pixel data of the second sub-image.

In some embodiments, when a plurality of frames of original images are acquired and it is determined that a current frame of original image to be displayed is not a first frame of original image, the pixel data of a first frame of sub-image may be calculated with reference to the pixel data of a previous frame of sub-image, and may be determined by the following methods 1 and 2.

Method 1, determining the first frame of sub-image as a first sub-image; and determining the pixel data of the first frame of sub-image, according to:

a difference value between the pixel values of the first sub-image and the second sub-image of the current frame of original image at the corresponding position, and mean values of the backlight data of the first sub-image of the current frame of original image in respective partitions in the backlight assembly and the backlight data of the first sub-image of the previous frame of original image in the respective partitions.

In some embodiments, when it is determined that the first frame of sub-image is the first sub-image, the pixel data of the first frame of sub-image is determined specifically by:

determining the pixel data of the first frame of sub-image, according to a ratio of the difference value between the pixel values of the first sub-image and the second sub-image at the corresponding position to the mean value of the pixel point in the partition in the backlight assembly at the corresponding position.

In implementation, firstly, a difference value between pixel values of the first sub-image and the second sub-image of the current frame of original image at a corresponding position is calculated, where each pixel position of the current frame of original image corresponds to one difference value. Then, a mean value of backlight data of the first sub-image of the current frame of original image in each partition in a backlight assembly and backlight data of the first sub-image of a previous frame of original image at the partition is calculated. Finally, the pixel data of each pixel position is determined, according to the ratio of the difference value corresponding to the pixel position to the mean value of the partition corresponding to the pixel position. Namely, the ratios corresponding to respective pixel positions are determined as the pixel data of the first frame of sub-image.

In this method, if the first frame of sub-image is the first sub-image, the pixel data of the first sub-image may be calculated according to the above method, and the pixel data of the first sub-image corresponding to the subsequent frame of original image is determined according to the following method, where the following steps are performed for each frame of the subsequent frames of original images:

determining the pixel data of the first sub-image according to the ratio of the difference value between the pixel values of the first sub-image and the second sub-image at the corresponding position to the backlight data of the pixel point at the corresponding position in the partition in the backlight assembly.

Method 2, determining the first frame of sub-image as a second sub-image; and determining the pixel data of the first frame of sub-image, according to the pixel values in the second sub-image of the current frame of original image, and the mean values of the backlight data of the second sub-image of the current frame of original image in respective partitions in the backlight assembly and the backlight data of the second sub-image of the previous frame of original image in the respective partitions.

In some embodiments, when it is determined that the first frame of sub-image is the second sub-image, the pixel data of the first frame of sub-image is determined specifically by:

determining the pixel data of the first frame of sub-image, according to a ratio of the pixel value in the second sub-image to the mean value of the corresponding partition in the backlight assembly.

In implementation, the pixel value of the second sub-image of the current frame of original image at each pixel position is calculated, and then the mean value of the backlight data of the second sub-image of the current frame of original image in each partition in the backlight assembly and the backlight data of the second sub-image of the previous frame of original image in the partition is calculated. Finally, the pixel data at each pixel position is determined according to the ratio of the pixel value at the pixel position to the mean value of the backlight data of the partition corresponding to the pixel position, thereby obtaining the pixel data of the first frame of sub-image. That is, the ratios corresponding to respective pixel positions are determined as the pixel data of the first frame of sub-image.

In some embodiments, when determining the second sub-image, the calculation may be performed further with reference to the adjacent frame of original image. In implementation, when a plurality of frames of original images are acquired and it is determined that the current frame of original image to be displayed is not the first frame of original image, the second sub-image is determined as follows:

determining the second sub-image, according to the minimum value between the minimum pixel value among respective first sub-images of the current frame of original image at the corresponding position and the minimum pixel value among respective first sub-images of the previous frame of original image at the corresponding position.

In implementation, the minimum pixel value among respective first sub-images of the current frame of original image at the corresponding position (i.e. the same pixel position) is calculated first, then the minimum pixel value among respective first sub-images of the previous frame of original image at the corresponding position is calculated, finally the minimum value between the above two minimum pixel values is taken at the corresponding pixel position, and the second sub-image is determined according to the minimum values at respective pixel positions. That is, the pixel values in the second sub-image are determined according to the minimum values at respective pixel positions.

In some embodiments, the backlight data of the first sub-image and the second sub-image is determined by: setting each of the backlight data of the first sub-image and the second sub-image to be a preset value. For example, the backlight data of the first sub-image and the second sub-image are both set to 255.

In some embodiments, the pixel data of the first sub-image may be alternatively determined by:

determining the maximum difference value of each partition in the backlight assembly, according to the difference value between the pixel values of the first sub-image and the second sub-image at the corresponding position; and determining the pixel data of the first sub-image, according to a ratio of the difference value corresponding to each pixel point in the first sub-image to the maximum difference value of the partition corresponding to the pixel point.

In implementation, the maximum difference value of each partition in the backlight assembly is determined according to the difference value between the pixel values of the first sub-image and the second sub-image at the corresponding position (each pixel position); then the difference value between the pixel values of the first sub-image and the second sub-image at each pixel position is calculated. Finally, the ratio of the difference value corresponding to each pixel position to the maximum difference value of the partition corresponding to the pixel position is calculated, and the ratios corresponding to respective pixel positions are taken as the pixel data of the first sub-image.

In some embodiments, the pixel data of the second sub-image may be alternatively determined by:

determining the maximum pixel values of respective partitions in the backlight assembly, according to respective pixel values in the second sub-image; and determining the pixel data of the second sub-image, according to ratios of the respective pixel values in the second sub-image to the maximum pixel values of the respective partitions.

In implementation, firstly, the maximum pixel value of the second sub-image is screened out for each partition, and then the pixel data of the second sub-image is determined according to the ratio of the pixel value at each pixel position to the maximum pixel value of the partition where the pixel position is located, where the ratios corresponding to the respective pixel positions serve as the pixel data of the second sub-image.

Figure 7:
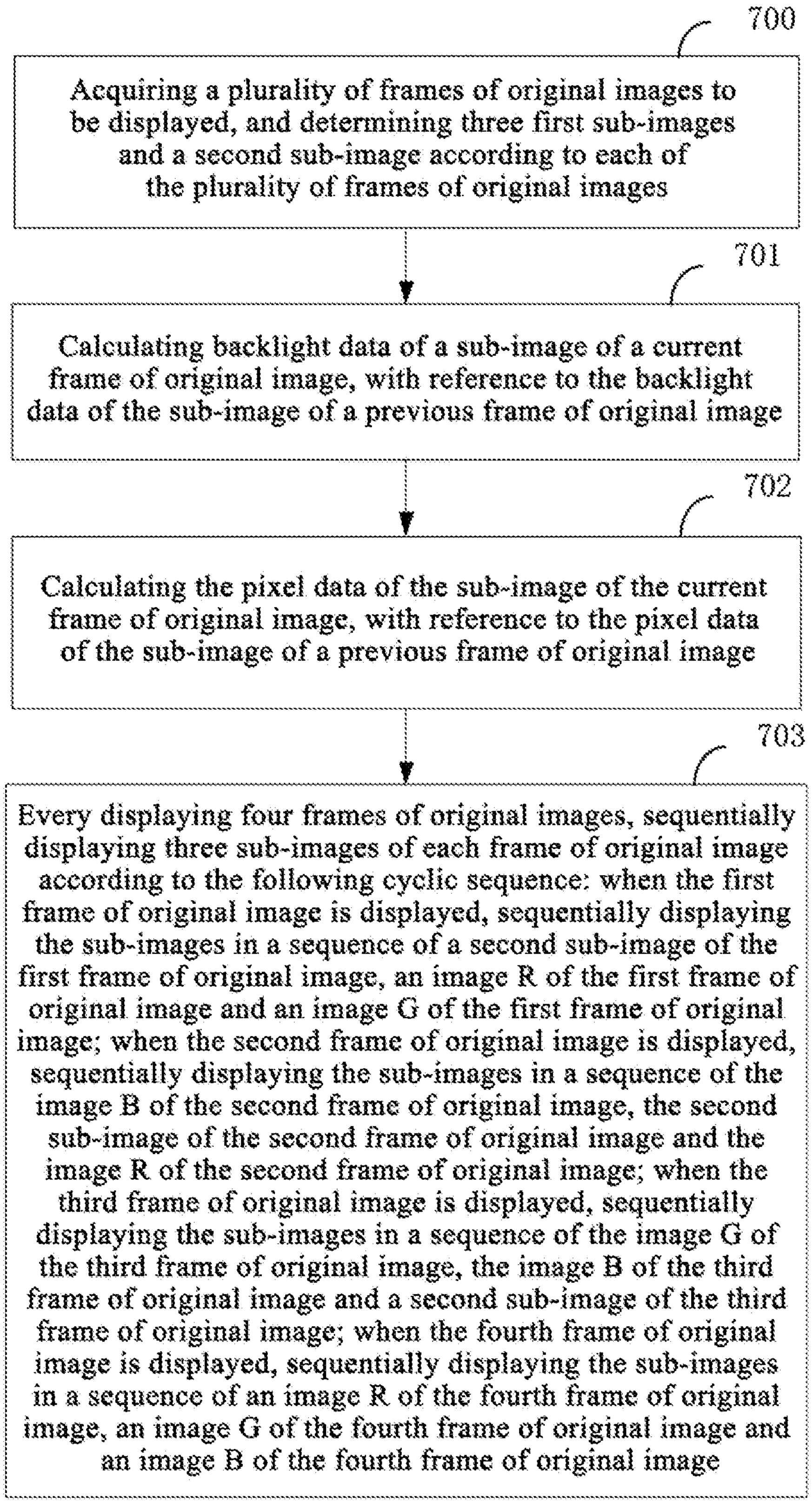
FIG. 7 is a flowchart illustrating a method of circularly displaying while inhibiting color separation according to an embodiment of the present disclosure.

As shown in FIG. 7, this embodiment provides a method of circularly displaying while inhibiting color separation, which has a core idea that an original image (taking an RGB image as an example) is split into three first sub-images, i.e., an image R, an image G, and an image B, a second sub-image X is determined according to the three first sub-images. When displaying, circularly displaying is performed in the sequence of XRG, BXR, GBX, and RGB. When this method is executed, all backlights are lit up when the first sub-image is displayed, and color components that cannot be fully displayed in the first sub-image are displayed separately in subsequent frames. The specific implementation flow of the method is as shown in steps 700 to 703.

At the step 700, a plurality of frames of original images to be displayed are acquired, and three first sub-images and a second sub-image are determined according to each of the plurality of frames of original images.

In implementation, according to the number of channels of the original image, the original image is split into three images each having a single channel, and the images each having a single channel are determined as first sub-images.

The first sub-images include an image R, an image G, and an image B. The second sub-image is determined according to the minimum pixel value at a corresponding position among the plurality of first sub-images.

At the step 701, backlight data of a sub-image of a current frame of original image, with reference to the backlight data of the sub-image of a previous frame of original image.

The backlight data of the first frame of sub-image is determined by the following method.

1) In implementation, when it is determined that the first frame of sub-image is the first sub-image, the backlight data of the first frame of sub-image in each partition in the backlight assembly is determined, according to a mean value of the backlight data of the first sub-image of the current frame of original image in the partition and the backlight data of the first sub-image of a previous frame of original image in the partition. The backlight data of the first sub-image of the current frame of original image and the first sub-image of the previous frame of original image in each partition can be determined as follows: determining the maximum difference value in each partition, according to the difference value between the pixel values of the first sub-image and the second sub-image at the corresponding position in the partition in the backlight assembly; and determining the backlight data of the first sub-image in each partition, according to the maximum difference value in the partition.

2) In implementation, when it is determined that the first frame of sub-image is the second sub-image, the backlight data of the first frame of sub-image in each partition in the backlight assembly is determined according to a mean value of the backlight data of the second sub-image of the current frame of original image in the partition and the backlight data of the second sub-image of the previous frame of original image in the partition. The backlight data of the second sub-images of the current frame of original image and the previous frame of original image in each partition each can be determined as follows: determining backlight data of the second sub-image in each partition in the backlight assembly, according to the maximum value of the pixel values of the second sub-image in the partition.

In implementation, the backlight data of each subsequent frame of first sub-image (NOT the first frame of sub-image) of the current frame of original image is determined as follows:

determining the maximum difference value in each partition in the backlight assembly, according to the difference value between the pixel values of the first sub-image and the second sub-image at the corresponding position in the partition; and determining backlight data of the first sub-image in each partition, according to the maximum difference value in the partition.

In implementation, the backlight data of each subsequent frame of second sub-image (NOT the first frame of sub-image) of the current frame of original image is determined as follows:

determining backlight data of the second sub-image in each partition in the backlight assembly, according to the maximum value of the pixel values of the second sub-image in the partition.

At the step 702, the pixel data of the sub-image of the current frame of original image is calculated, with reference to the pixel data of the sub-image of a previous frame of original image.

In implementation, the pixel data of a first frame of sub-image in the at least part of sub-images to be displayed is determined by the following method.

1) When it is determined that the first frame of sub-image is the first sub-image, the pixel data of the first frame of sub-image is determined, according to the difference value between the pixel values of the first sub-image and the second sub-image of the current frame of original image at the corresponding position, and the mean value of the backlight data of the first sub-image of the current frame of original image in each partition in the backlight assembly and the backlight data of the first sub-image of the previous frame of original image in the partition.

2) When it is determined that the first frame of sub-image is the second sub-image, the pixel data of the first frame of sub-image is determined according to pixel values of the second sub-image of the current frame of original image, and the mean value of the backlight data of the second sub-image of the current frame of original image in each partition in the backlight assembly and the backlight data of the second sub-image of the previous frame of original image in the partition.

In implementation, the pixel data of the subsequent frames of displayed sub-images is determined by the following method.

1) The pixel data of the first sub-image is determined according to a ratio of the difference value between the pixel values of the first sub-image and the second sub-image at a corresponding position to the backlight data of the partition of the pixel point at the corresponding position in the backlight assembly.

2) The pixel data of the second sub-image is determined according to the ratio of each pixel value of the second sub-image to the backlight data of the corresponding partition in the backlight assembly.

At the step 703, every four frames of original images are displayed, three sub-images of each frame of original image are sequentially displayed according to the following cyclic sequence: when the first frame of original image is displayed, sequentially displaying the sub-images in a sequence of a second sub-image of the first frame of original image, an image R of the first frame of original image and an image G of the first frame of original image; when the second frame of original image is displayed, sequentially displaying the sub-images in a sequence of the image B of the second frame of original image, the second sub-image of the second frame of original image and the image R of the second frame of original image; when the third frame of original image is displayed, sequentially displaying the sub-images in a sequence of the image G of the third frame of original image, the image B of the third frame of original image and a second sub-image of the third frame of original image; when the fourth frame of original image is displayed, sequentially displaying the sub-images in a sequence of an image R of the fourth frame of original image, an image G of the fourth frame of original image and an image B of the fourth frame of original image.

This embodiment takes a cyclic display of XRG-BXR-GBX-RGB as an example, to describe the display method in this embodiment. It is sequentially displayed in a cyclic sequence of: the second sub-image X, the image R, and the image G of the first frame of original image; the image B, the second sub-image X and the image R of the second frame of original image; the image G, the image B and the second sub-image X of the third frame of original image; the image R, the image G, and the image B of the fourth frame of original image, and so on, which are not listed one by one herein.

Figure 8:
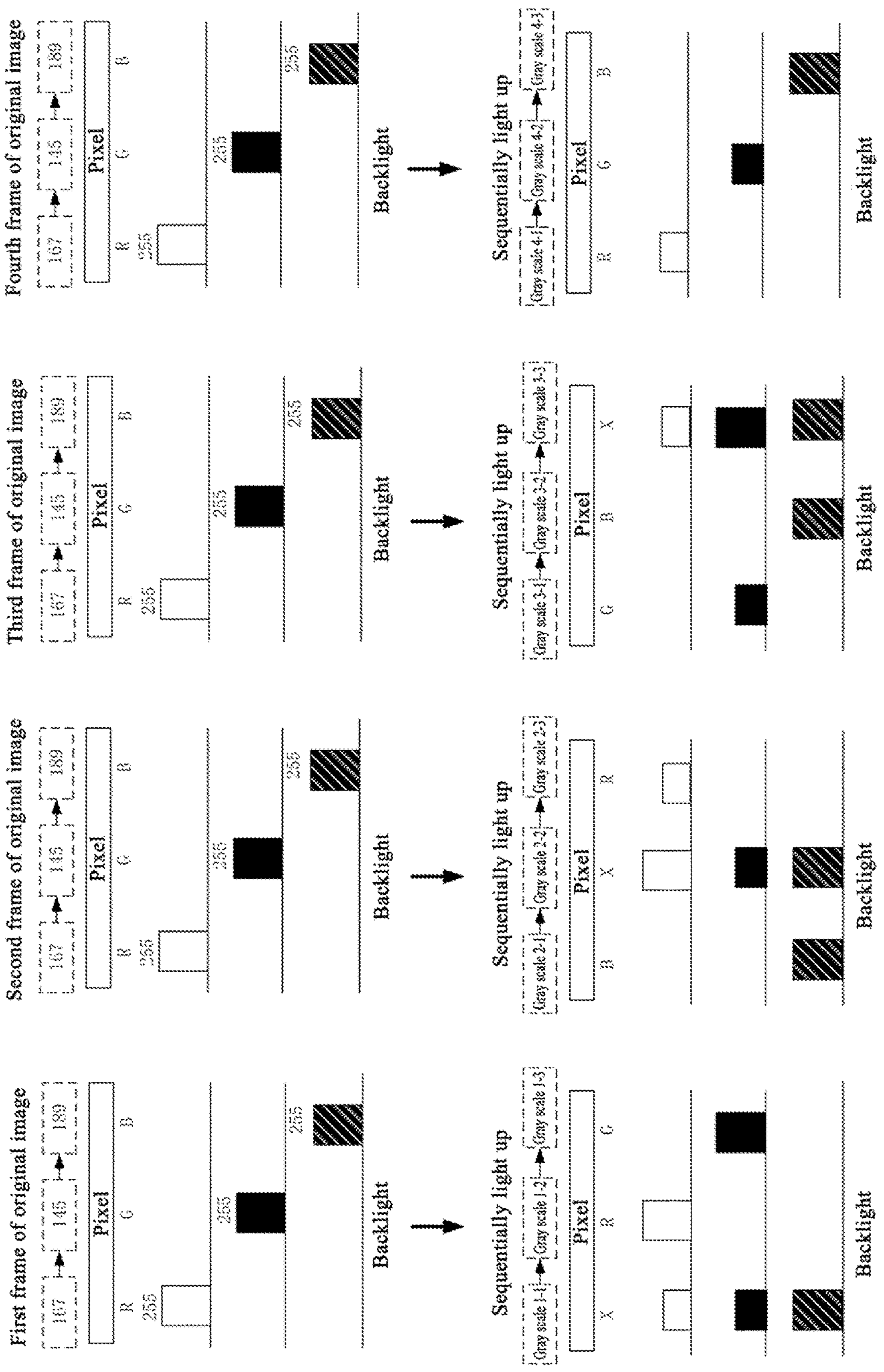
FIG. 8 is a schematic diagram illustrating a cyclic display according to an embodiment of the present disclosure.

As shown in FIG. 8, this embodiment provides a schematic diagram illustrating a cyclic display. In implementation, every four frames of original images are used as a process of a cyclic display. That is, every four frames of original images can be sequentially displayed according to the following sequence. When a first frame of original image is displayed, it is displayed in the sequence of XRG. A second sub-image X is displayed first, where backlight data of the second sub-image X includes three colors of red, green, and blue, pixel data of the second sub-image X is gray scale 1-1. Then backlight data of the image R includes red, pixel data of the image R is gray scale 1-2. Finally an image G is displayed, where backlight data of the image G includes green, and pixel data of the image G is gray scale 1-3. The second sub-image X, the image R and the image G at the moment are determined based on the first frame of original image.

When the second frame of original image is displayed, it is displayed in the sequence of BXR. Firstly an image B is displayed, where the backlight data of the image B includes blue, the pixel data of the image B is gray scale 2-1. Then a second sub-image X is displayed, where the backlight data of the second sub-image X includes red, green and blue, and the pixel data of the second sub-image X is gray scale 2-2. Finally an image R is displayed, where the backlight data of the image R includes red, the pixel data of the image R is gray scale 2-3. The image B, the second sub-image X and the image R at the moment are determined based on the second frame of original image.

When the third frame of original image is displayed, it is displayed in the sequence of GBX. Firstly an image G is displayed, where the backlight data of the image G includes green, the pixel data of the image G is gray scale 3-1. Then an image B is displayed, where the backlight data of the image B includes green, the pixel data of the image B is gray scale 3-2. Finally a second sub-image X is displayed, where the backlight data of the second sub-image X includes three colors of red, green and blue, and the pixel data of the second sub-image X is gray scale 3-3. The image G, the image B and the second sub-image X at the moment are determined based on the third frame of original image.

When the fourth frame of original image is displayed, it is displayed in the sequence of RGB. Firstly an image R is displayed, where the backlight data of the image R includes red, and the pixel data of the image R is gray scale 4-1. Then an image G is displayed, where the backlight data of the image G includes green, and the pixel data of the image G is gray scale 4-2. Finally an image B is displayed, where the backlight data of the image B includes blue, and the pixel data of the image B is gray scale 4-3. The image R, the image G and the image B at the moment are determined based on the fourth frame of original image.

In implementation, in the process of displaying four frames of original images, the backlight data of the second sub-image corresponding to each frame of original image serves to drive the backlight assembly to emit light with all colors contained in the backlight assembly, and the backlight data of the sub-images except the second sub-image serves to drive the backlight assembly to each time emit light with one color contained in the backlight assembly, so that the color separation phenomenon is eliminated.

Step a), an original image to be displayed is acquired, and pixel values of three channels R, G, B of the original image are extracted, to form three pure-color first sub-images.

Step b), the following steps for each of the partitions in the backlight assembly are performed:

for the current frame and the previous adjacent frame, respectively calculating gamma values (also called as gamma coefficients) corresponding to pixel values (i.e. gray values) of each pixel point in the partition, where the purpose of calculating the gamma values is to normalize the pixel values for convenience of calculation.

(1) For the previous frame of original image, the calculation formulas are as follows:

$$L_{R_n-1}=\left(\frac{\text{Gray}_{R_n-1}}{255}\right)^{2.2}\times 1 \qquad \text{Formula (1)}$$

$$L_{G_n-1}=\left(\frac{\text{Gray}_{G_n-1}}{255}\right)^{2.2}\times 1$$

$$L_{B_n-1}=\left(\frac{\text{Gray}_{B_n-1}}{255}\right)^{2.2}\times 1;$$

$$L_{X_n-1}=\min\{L_{R_n-1},L_{G_n-1},L_{B_n-1}\} \qquad \text{Formula (2)}$$

$$L'_{R_n-1}=L_{R_n-1}-L_{X_n-1}$$

$$L'_{G_n-1}=L_{G_n-1}-L_{X_n-1}$$

$$L'_{B_n-1}=L_{B_n-1}-L_{X_n-1};$$

In the above formulas, $\text{Gray}_{R_n\text{-}1}$ represents the pixel value of the image R of the previous frame of original image, $\text{Gray}_{G_n\text{-}1}$ represents the pixel value of the image G of the previous frame of original image, and $\text{Gray}_{B_n\text{-}1}$ represents the pixel value of the image B of the previous frame of original image; $L_{R_n\text{-}1}$ represents the gamma value of the image R of the previous frame of original image, $L_{G_n\text{-}1}$ represents the gamma value of the image G of the previous frame of original image, and $L_{B_n\text{-}1}$ represents the gamma value of the image B of the previous frame of original image.

$L_{X_n\text{-}1}$ represents the gamma value of the second sub-image X of the previous frame of original image. In implementation, the minimum pixel value is selected from the respective first sub-images (image R, image G, image B) of the previous frame of original image, as the pixel value in the second sub-image X, so that the gamma value of the second sub-image X is determined.

(1) For the current frame of original image, the calculation formulas are as follows:

$$L_{R_n}=\left(\frac{\text{Gray}_{R_n}}{255}\right)^{2.2}\times 1 \qquad \text{Formula (3)}$$

$$L_{G_n}=\left(\frac{\text{Gray}_{G_n}}{255}\right)^{2.2}\times 1$$

$$L_{B_n}=\left(\frac{\text{Gray}_{B_n}}{255}\right)^{2.2}\times 1;$$

$$L_{X_n}=\min\{\{L_{R_n},L_{G_n},L_{B_n}\} \qquad \text{Formula (4)}$$

$$L'_{R_n}=L_{R_n}-L_{X_n}$$

$$L'_{G_n}=L_{G_n}-L_{X_n}$$

$$L'_{B_n}=L_{B_n}-L_{X_n};$$

In the above formula, $\text{Gray}_{R_n}$ represents the pixel value of the image R of the current frame of original image, $\text{Gray}_{G_n}$ represents the pixel value of the image G of the current frame of original image, and $Gray_{B_n}$ represents the pixel value of the image B of the current frame of original image; $L_{R_n}$ represents the gamma value of the image R of the current frame of original image, $L_{G_n}$ represents the gamma value of the image G of the current frame of original image, and $L_{B_n}$ represents the gamma value of the image B of the current frame of original image.

$L_{X_n}$ represents the gamma value of the second sub-image X of the current frame of original image. In implementation, the minimum pixel value is selected from the respective first sub-images (image R, image G, image B) of the current frame of original image, as the pixel value in the second sub-image X, so that the gamma value of the second sub-image X is determined.

Step c), calculating backlight data of the sub-images in each of the partitions in the backlight assembly by the following formulas:

$$L_{XD}L_{RD}L_{GD} = 0.5\left(\max_{m*n}\{L_{X_n-1}\} + \max_{m*n}\{L_{X_n}\}\right)\max_{m*n}\{L'_{R_n}\}\max_{m*n}\{L'_{G_n}\}; \quad \text{Formula (5)}$$

$$R/G/B = L_{XD}^{1/2.2} \cdot 255$$

$$R = (L_{RD})^{1/2.2} \cdot 255 \;\; G = 0 \;\; B = 0 \quad \text{Formula (6)}$$

$$R = 0 \;\; G = (L_{GC})^{1/2.2} \cdot 255 \;\; B = 0;$$

The above formula (5) represents the backlight data of the respective sub-images when the sub-images are displayed in the sequence of the second sub-image X, the image R and the image G. That is, $L_{XD}$ represents the backlight data of the second sub-image X in a partition, $L_{RD}$ represents the backlight data of the image R in the same partition, and $L_{GD}$ represents the backlight data of the image G in the same partition. $\max_{m*n}$ represents the maximum value in any partition composed of m×n pixel units, $\max_{m*n}\{L_{X_n}-1\}$ represents the maximum value among the gamma values of the second sub-image X of the previous frame of original image in any partition, $\max_{m*n}\{L_{X_n}\}$ represents the maximum value among the gamma values of the second sub-image X of the current frame of original image in any partition, and the rest are similar and are not repeated herein.

Equation (6) represents that when the first frame of sub-image (the second sub-image X) is displayed, all colors of the backlight (R/G/B) are lit up based on $L_{XD}$; when the second frame of sub-image (image R) is displayed, R (red) among the colors of the backlight is lit up based on $L_{RD}$, and other colors (G, B) are not lit up and all set to 0; and when the third frame of sub-image (image G) is displayed, G (green) among the colors of the backlight is lit up based on $L_{GD}$, and other colors (R, B) are not lit up and all set to 0.

Based on the same principle as above to calculate the backlight data, any one or more calculation formulas are also included as follows:

$$L_{BD}L_{XD}L_{RD} = 0.5\left(\max_{m*n}\{L'_{B_n-1}\} + \max_{m*n}\{L'_{B_n}\}\right)\max_{m*n}\{L_{X_n}\}\max_{m*n}\{L'_{R_n}\}; \quad \text{Formula (7)}$$

The above formula represents the backlight data of the respective sub-images when the sub-images are displayed in the sequence of the image B, the second sub-image X, and the image R; where $\max_{m*n}$ represents the maximum value in any partition composed of m×n pixel units.

When the first frame of sub-image (image B) is displayed, all colors of the backlight (R/G/B) are lit up based on LBD; when the second frame of sub-image (second sub-image X) is displayed, B (blue) among the colors of the backlight is lit up based on $L_{XD}$, and the other colors (R, G) are not lit up and all are set to 0; and when the third frame of sub-image (image R) is displayed, R (red) among the colors of the backlight is lit up based on $L_{RD}$, and the other colors (G, B) are not lit up and all are set to 0.

$$L_{GD}L_{BD}L_{XD} = 0.5\left(\max_{m*n}\{L'_{G_n-1}\} + \max_{m*n}\{L'_{G_n}\}\right)\max_{m*n}\{L'_{B_n}\}\max_{m*n}\{L_{X_n}\}; \quad \text{Formula (8)}$$

The above formula represents the backlight data of the respective sub-images when the sub-images are displayed in the sequence of the image G, the image B, and the second sub-image X; where $\max_{m*n}$ represents the maximum value in any partition composed of m×n pixel units.

When the first frame of sub-image (image G) is displayed, all colors of the backlight (R/G/B) are lit up based on $L_{GD}$; when the second frame of sub-image (image B) is displayed, B (blue) among the colors of the backlight is lit up based on LBD, and other colors (R, G) are not lit up and all are set to 0; and when the third frame of sub-image (image X) is displayed, R (red) among the colors of the backlight is lit up based on $L_{XD}$, and other colors (G, B) are not lit up and all are set to 0, based on R (red) in the backlight colors.

$$L_{GD}L_{BD}L_{XD} = 0.5\left(\max_{m*n}\{L'_{R_n-1}\} + \max_{m*n}\{L'_{R_n}\}\right)\max_{m*n}\{L'_{G_n}\}\max_{m*n}\{L_{B'_n}\}; \quad \text{Formula (9)}$$

The above formula represents the backlight data of the respective sub-images when the sub-images are displayed in the sequence of the image R, the image G, and the image B; where $\max_{m*n}$ represents the maximum value in any partition composed of m×n pixel units.

When the first frame of sub-image (image R) is displayed, all colors of the backlight (R/G/B) are lit up based on $L_{RD}$; when the second frame of sub-image (image G) is displayed, G (green) among the colors of the backlight colors is lit up based on $L_{GD}$, and other colors (R, B) are not lit up and all are set to 0; and when the third frame of sub-image (image B) is displayed, B (blue) among the colors of the backlight colors is lit up based on LBD, and other colors (G, R) are not lit up and all are set to 0.

Step d), the pixel data of the respective sub-images is calculated by the following formulas.

In implementation, when the sub-images are displayed in the sequence of the second sub-image X, the image R, and the image G, the pixel data of each sub-image is calculated by the following formulas:

$$L_{XC}L_{RC}L_{GC} = \left(L_{X_n}/L_{XD}\right)\left(L'_{R_n}/L_{RD}\right)\left(L'_{G_n}/L_{GD}\right) \quad \text{Formula (10)}$$

$$VX = L_{XC}^{1/2.2} \cdot 255$$

$$VR = L_{RC}^{1/2.2} \cdot 255$$

$$VG = L_{GC}^{1/2.2} \cdot 255;$$

$L_{XC}$ represents the pixel data of the second sub-image X, and since $L_{XC}$ is greater than or equal to 0 and less than or equal to 1, $L_{XC}$ is required to be converted. VX represents the pixel value obtained after the pixel data of the second sub-image X is converted, and is greater than or equal to 0 and less than or equal to 255, which is convenient for the subsequent display of pixel units. LRC represents the pixel data of the image R, and VR represents the pixel value obtained after the pixel data of the image R is converted. $L_{GC}$ represents the pixel data of the image G, and VG represents the pixel value obtained after the pixel data of the image G is converted. The meanings of other parameters may be referred to the content as described above, and are not repeated herein.

It should be noted that, the pixel data is for each pixel point, but when the pixel data is calculated, the brightness of the sub-image may be increased to some extent by performing calculation with the backlight data of each partition.

In implementation, when the sub-images are displayed in the sequence of the image B, the second sub-image X, and the image R, the pixel data of the respective sub-images is calculated by the following formula:

$$L_{BC}L_{XC}L_{RC} = (L'_{B_n}/L_{BD})(L_{X_n}/L_{XD})(L'_{R_n}/L_{RD}) \quad \text{Formula (11)}$$

$$VB = L_{BC}^{1/2.2} \cdot 255$$

$$VX = L_{XC}^{1/2.2} \cdot 255$$

$$VR = L_{RC}^{1/2.2} \cdot 255;$$

$L_{BC}$ represents the pixel data of the image B, and VB represents the pixel value obtained after the pixel data of the image B is converted. $L_{XC}$ represents the pixel data of the second sub-image X, and VX represents the pixel value obtained after the pixel data of the second sub-image X is converted. LRC represents the pixel data of the image R, and VR represents the pixel value obtained after the pixel data of the image R is converted. The meanings of other parameters may be referred to the content as described above, and are not repeated herein.

In implementation, when the sub-images are displayed in the sequence of the image G, the image B, and the second sub-image X, the pixel data of the respective sub-images is calculated by the following formula:

$$L_{GC}L_{BC}L_{XC} = (L'_{G_n}/L_{GD})(L'_{B_n}/L_{BD})(L_{X_n}/L_{XD}) \quad \text{Formula (12)}$$

$$VG = L_{GC}^{1/2.2} \cdot 255$$

$$VB = L_{BC}^{1/2.2} \cdot 255$$

$$VX = L_{XC}^{1/2.2} \cdot 255;$$

$L_{GC}$ represents the pixel data of the image G, and VG represents the pixel value obtained after the pixel data of the image G is converted. $L_{BC}$ represents the pixel data of the image B, and VB represents the pixel value obtained after the pixel data of the image B is converted. $L_{XC}$ represents the pixel data of the second sub-image X, and VX represents the pixel value obtained after the pixel data of the second sub-image X is converted. The meanings of other parameters may be referred to the content as described above, and are not repeated herein.

In implementation, when the sub-images are displayed in the sequence of the image R, the image G, and the image B, the pixel data of the respective sub-images is calculated by the following formula:

$$L_{RC}L_{GC}L_{BC} = (L'_{R_n}/L_{RD})(L'_{G_n}/L_{GD})(L'_{B_n}/L_{BD}) \quad \text{Formula (13)}$$

$$VR = L_{RC}^{1/2.2} \cdot 255$$

$$VG = L_{GC}^{1/2.2} \cdot 255$$

$$VB = L_{BC}^{1/2.2} \cdot 255;$$

$L_{RC}$ represents the pixel data of the image R, and VR represents the pixel value obtained after the pixel data of the image R is converted. $L_{GC}$ represents the pixel data of the image G, and VG represents the pixel value obtained after the pixel data of the image G is converted. $L_{BC}$ represents the pixel data of the image B, and VB represents the pixel value obtained after the pixel data of the image B is converted. The meanings of other parameters may be referred to the content as described above, and are not repeated herein.

Step d), the backlight data and the pixel data of respective frames of sub-images are obtained through the above steps, the backlight data is sent to the backlight assembly through a connecting line, and the pixel data is sent to the screen, so that the finally presented picture of the original image can be seen on the screen.

Figure 9:
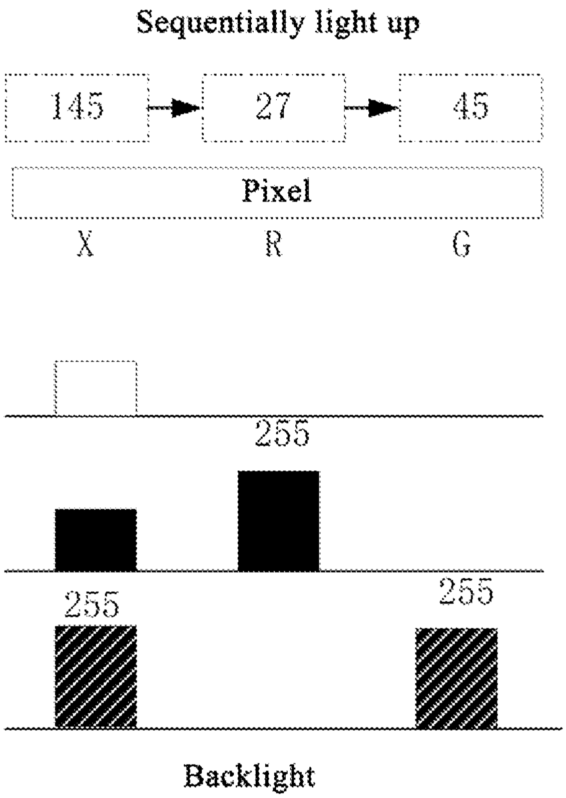
FIG. 9 is a schematic diagram illustrating an XRG compensation scheme according to embodiments of the present disclosure.

As shown in FIG. 9, this embodiment further provides a schematic diagram illustrating an XRG compensation scheme. When the sub-images are displayed in the sequence of the second sub-image X, the image R, and the image G, the backlight is fully lit up when displaying the first frame of sub-image (the second sub-image X), the brightness value of the blue backlight is set to 255, and the brightness values of red and green are determined according to the saturation; only the red backlight is lit up when displaying the second frame of sub-image; and only the green backlight is lit up when displaying the third frame of sub-image. By sequentially lighting up the backlight in the above sequence, the difference of color and brightness between respective frames of sub-images can be reduced as much as possible, the perception of a user on the subsequent frames of sub-images is reduced, and the color separation phenomenon is inhibited.

It should be noted that the core idea of this embodiment is to drive the backlight assembly to emit light with all colors of backlight when displaying the first frame of sub-image, but the brightness of the respective colors of backlight is not limited. The above manner of determining the backlight data is only an example, and the user may also determine the brightness of the respective colors of backlight when displaying the first frame of sub-image according to practical requirements, which is not excessively limited in the embodiments.

Figure 10:
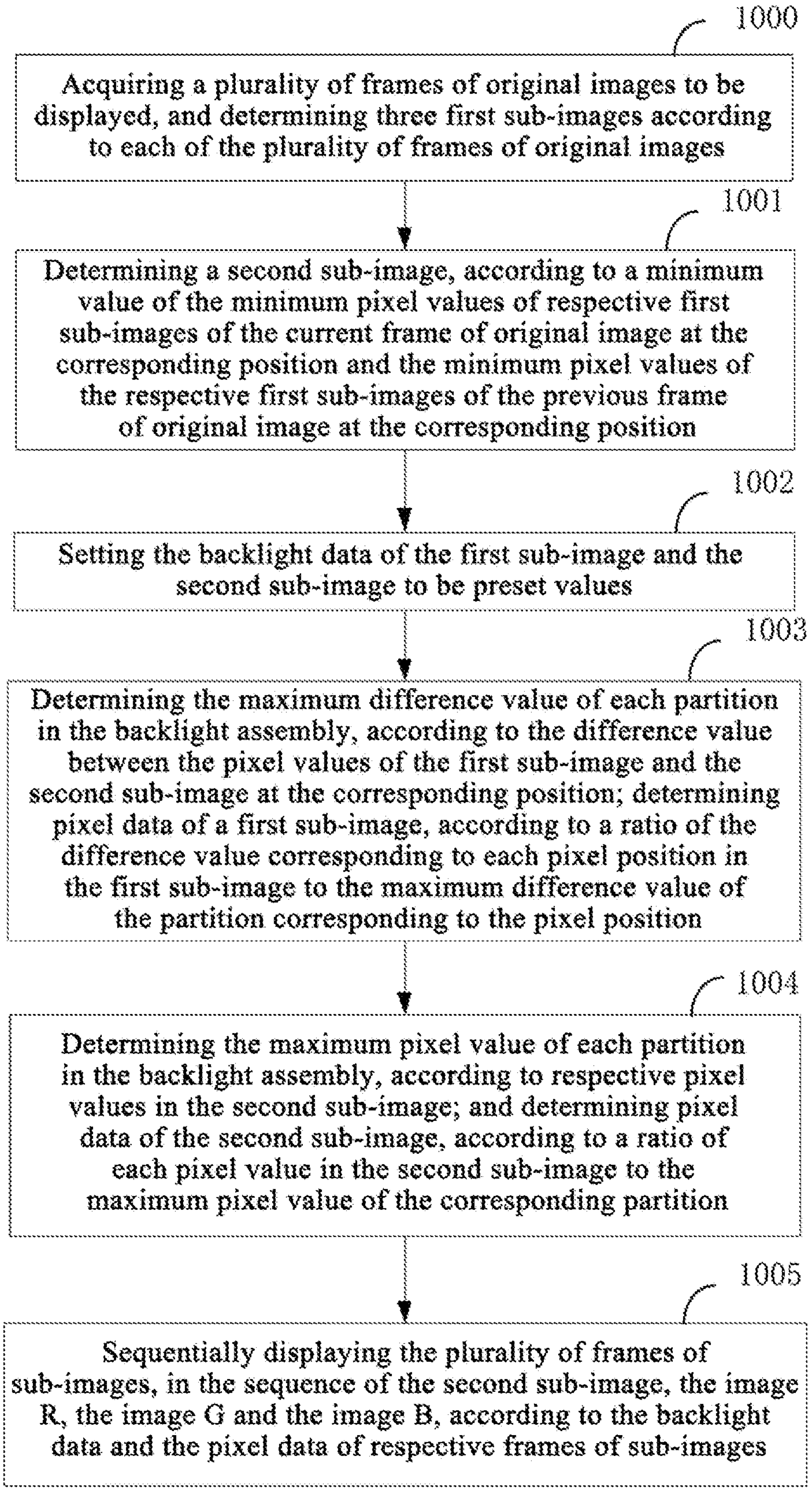
FIG. 10 is a flowchart illustrating a method of fully displaying while inhibiting color separation according to an embodiment of the present disclosure.

As shown in FIG. 10, this embodiment provides a method of fully displaying while inhibiting color separation, which has a core idea that an original image (taking an RGB image as an example) is split into three first sub-images, i.e., an image R, an image G and an image B, a second sub-image W is determined according to the three first sub-images, and when displaying, the displaying is performed in the sequence of WRGB during display. When the method is executed, a total pixel value is replaced by the minimum pixel value in the image R, the image G and the image B when a first frame of sub-image (i.e., the second sub-image W) is displayed, and the subsequent three sub-images serve to compensate for the missing brightness of image R, image G, image B, respectively. The specific implementation flow of the method is as shown in steps 1000 to 1005.

At the step 1000, a plurality of frames of original images to be displayed are acquired, and three first sub-images are determined according to each of the plurality of frames of original images.

In implementation, according to the number of channels of the original image, the original image is split into three images each having a single channel, and the images each having a single channel are determined as first sub-images. The first sub-images include an image R, an image G, and an image B.

At the step 1001, a second sub-image is determined, according to a minimum value among the minimum pixel values of respective first sub-images of the current frame of original image at the corresponding position and the minimum pixel values of the respective first sub-images of the previous frame of original image at the corresponding position.

In implementation, the gamma values of the pixel values of the respective sub-images of the two adjacent frames of original images are calculated by the following formula:

$$L_{R_n-1} = \left(\frac{\text{Gray}_{R_n-1}}{255}\right)^{2.2} \times 1 \quad \text{Formula (14)}$$
$$L_{G_n-1} = \left(\frac{\text{Gray}_{G_n-1}}{255}\right)^{2.2} \times 1$$
$$L_{B_n-1} = \left(\frac{\text{Gray}_{B_n-1}}{255}\right)^{2.2} \times 1;$$

In the above formula, $\text{Gray}_{R_n\text{-}1}$ represents the pixel value of the image R of the previous frame of original image, $\text{Gray}_{G_n\text{-}1}$ represents the pixel value of the image G of the previous frame of original image, and $\text{Gray}_{B_n\text{-}1}$ represents the pixel value of the image B of the previous frame of original image; $L_{R_n\text{-}1}$ represents the gamma value of the image R of the previous frame of original image, $L_{G_n\text{-}1}$ represents the gamma value of the image G of the previous frame of original image, and $L_{B_n\text{-}1}$ represents the gamma value of the image B of the previous frame of original image.

$$L_{R_n} = \left(\frac{\text{Gray}_{R_n}}{255}\right)^{2.2} \times 1 \quad \text{Formula (15)}$$
$$L_{G_n} = \left(\frac{\text{Gray}_{G_n}}{255}\right)^{2.2} \times 1$$
$$L_{B_n} = \left(\frac{\text{Gray}_{B_n}}{255}\right)^{2.2} \times 1;$$

In the above formula, $\text{Gray}_{R_n}$ represents the pixel value of the image R of the current frame of original image, $\text{Gray}_{G_n}$ represents the pixel value of the image G of the current frame of original image, and $\text{Gray}_{B_n}$ represents the pixel value of the image B of the current frame of original image; $L_{R_n}$ represents the gamma value of the image R of the current frame of original image, $L_{G_n}$ represents the gamma value of the image G of the current frame of original image, and $L_{B_n}$ represents the gamma value of the image B of the current frame of original image.

$$L_R = \min\{L_{R_n-1}, L_{R_n}\} \quad \text{Formula (16)}$$
$$L_G = \min\{L_{G_n-1}, L_{G_n}\};$$

-continued $$L_B = \min\{L_{B_n-1}, L_{B_n}\} \quad \text{Formula (17)}$$
$$L_{w_n} = \min\{L_R, L_G, L_B\};$$

In the above formulas, $L_{w_n}$ represents the gamma value of the pixel value of the second sub-image.

At the step 1002, the backlight data of the first sub-image and the second sub-image each is set to be a preset value.

In implementation, the backlight data of both the first sub-image and the second sub-image are set to 255. When the first frame of sub-image is displayed, all colors of backlights, i.e., R, G, B are all lit up to 255, and when the following three frames of sub-images are displayed, each time one color of backlight is lit up to 255. For example, the backlights of 255 may be lit up in sequence of R, G, and B.

At the step 1003, the maximum difference value of each partition in the backlight assembly is determined, according to the difference value between the pixel values of the first sub-image and the second sub-image at the corresponding position; pixel data of a first sub-image is determined, according to a ratio of the difference value corresponding to each pixel position in the first sub-image to the maximum difference value of the partition corresponding to the pixel position.

In implementation, the pixel data of the first sub-image is calculated by the following formula:

$$R = \left((L_R - L_{w_n})/\text{max}_{m*n}\{L_R - L_{w_n}\}\right)^{1/2.2} \cdot 255 \quad \text{Formula (18)}$$
$$G = \left((L_G - L_{w_n})/\text{max}_{m*n}\{L_G - L_{w_n}\}\right)^{1/2.2} \cdot 255$$
$$B = \left((L_B - L_{w_n})/\text{max}_{m*n}\{L_B - L_{w_n}\}\right)^{1/2.2} \cdot 255$$

where $\text{max}_{m*n}$ represents the maximum value in any partition composed of m×n pixel units, R represents pixel data of the image R, G represents pixel data of the image G, and B represents pixel data of the image B.

At the step 1004, the maximum pixel value of each partition in the backlight assembly is determined, according to respective pixel values in the second sub-image; and pixel data of the second sub-image is determined, according to a ratio of each pixel value in the second sub-image to the maximum pixel value of the corresponding partition.

In implementation, the pixel data of the second sub-image W is calculated by the following formula:

$$W = \left(\min\{L_R, L_G, L_B\}/\text{max}_{m*n}\{\min\{L_R, L_G, L_B\}\}\right)^{1/2.2} \cdot 255; \quad \text{Formula (19)}$$

where W represents the pixel data of the second sub-image, and the rest of the parameters may be referred to the content as described above, and are not repeated herein.

At the step 1005, the plurality of frames of sub-images are sequentially displayed, in the sequence of the second sub-image, the image R, the image G and the image B, according to the backlight data and the pixel data of respective frames of sub-images.

Figure 11:
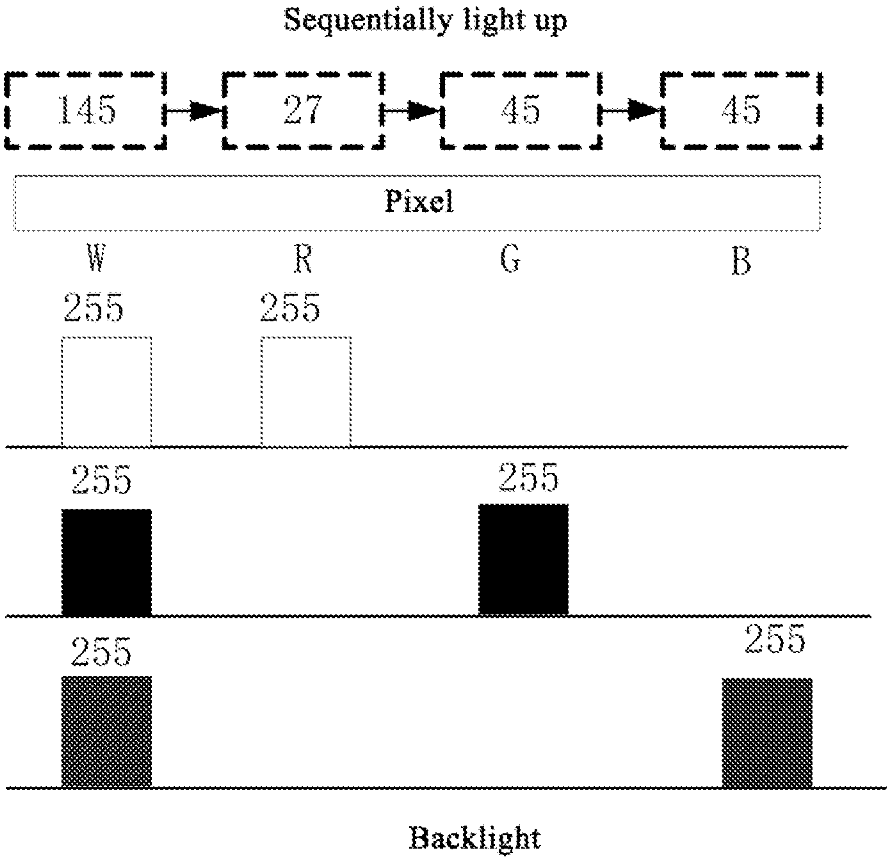
FIG. 11 is a schematic diagram illustrating a WRGB compensation scheme according to an embodiment of the present disclosure.

As shown in FIG. 11, this embodiment further provides a schematic diagram illustrating a WRGB compensation scheme. when displaying the sub-images in the sequence of the second sub-image W, the image R, the image G, and the image B, all colors of backlight are lit up to 255 when displaying the first frame of sub-image (the second sub-image W); only the red backlight is lit up to 255 when displaying the second frame of sub-image; only the green backlight is lit up to 255 when displaying the third frame of sub-image; and only the blue backlight is lit up to 255 when displaying the fourth frame of sub-image. With such a sequential lighting mode, the color and brightness difference between respective frames of sub-images can be reduced as much as possible, the perception of the user to the subsequent frames of sub-images can be reduced, and the color separation phenomenon can be inhibited.

Figure 12:
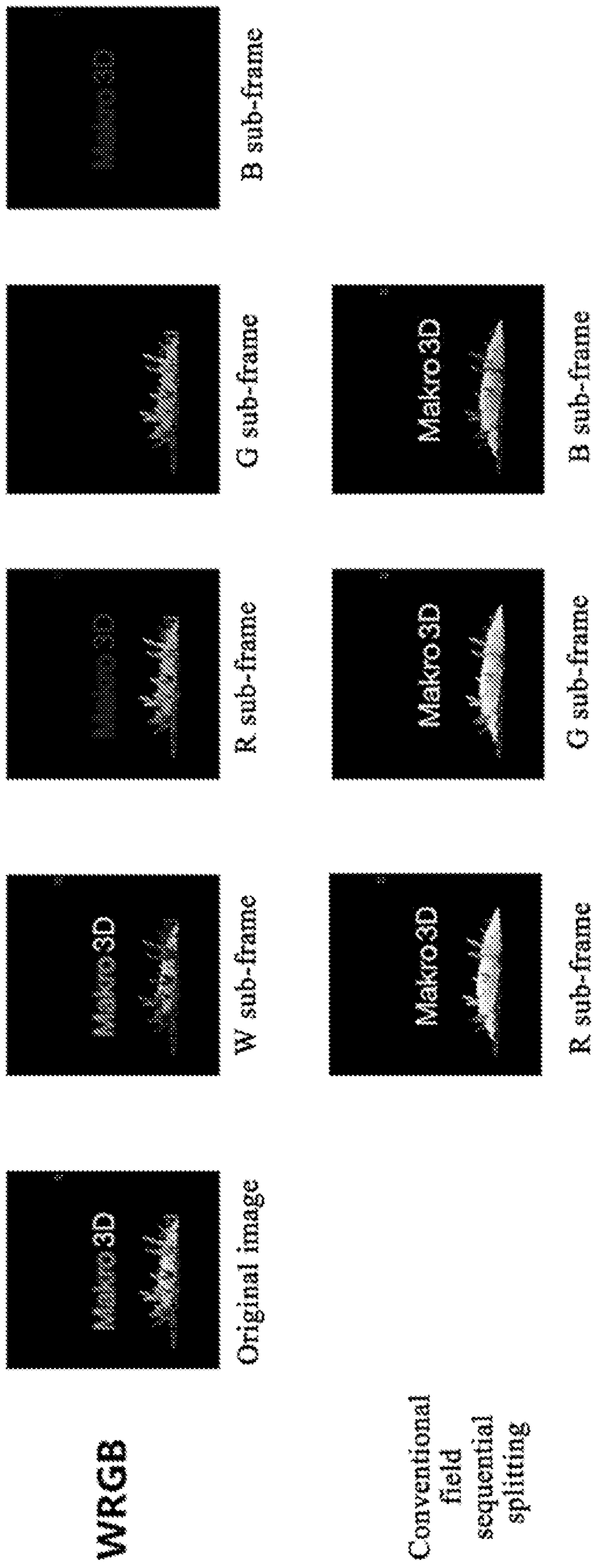
FIG. 12 is a schematic diagram illustrating comparison between respective frames of image based on a WRGB compensation scheme according to an embodiment of the present disclosure.

As shown in FIG. 12, this embodiment further provides a schematic diagram illustrating comparison between respective frames of sub-images based on the WRGB compensation scheme. A conventional field sequential display device splits an original image into a plurality of sub-images, including sequential scanning of an image R, an image G, and an image B. While this embodiment may split the original image into a second sub-image W, an image R, an image G, and an image B, for sequential scanning, where gray values of the respective split sub-images to be displayed on the panel are shown in the figure.

Figure 13:
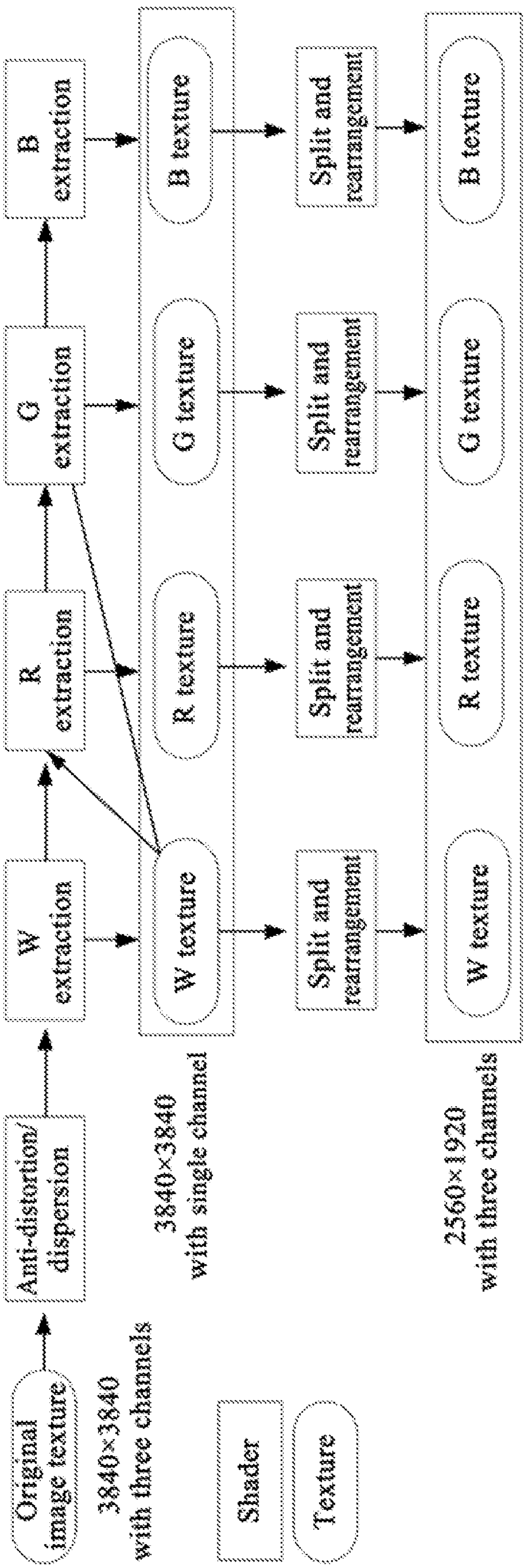
FIG. 13 is a schematic diagram illustrating an image rendering process in a WRGB compensation scheme according to an embodiment of the present disclosure.

In addition, as shown in FIG. 13, based on the WRGB compensation scheme according to this embodiment, a schematic diagram illustrating an image rendering process in the WRGB compensation scheme is provided. Since the original image is split into four frames, in the process of image rendering, the image texture of each frame of sub-image may be further split and rearranged after the scene texture in the original image is subjected to anti-distortion/dispersion processing. That is, the image texture of each frame of sub-image is split and rearranged, and the split and rearranged image texture is used in image rendering for the frame of sub-image.

Embodiment 2, based on the same inventive concept, an embodiment of the present disclosure further provides a field sequential display device. Since the device is the device in the method according to the embodiment of the present disclosure, and the principle of the device to solve the problem is similar to that of the method, the implementation of the device may be referred to the implementation of the method, and repeated parts are not described again.

Figure 14:
FIG. 14 is a schematic diagram illustrating a field sequential display device according to an embodiment of the present disclosure.

As shown in FIG. 14, the device includes a processor 1400 and a memory 1401, the memory 1401 serves to storing programs executable by the processor 1400, and the processor 1400 serves to read the programs in the memory 1401 and execute the following steps:

acquiring an original image to be displayed, and determining a plurality of frames of sub-images each having a single channel according to the original image, where the plurality of frames of sub-images include a plurality of first sub-images and a second sub-image determined according to the plurality of first sub-images;

determining backlight data and pixel data of each of the plurality of frames of sub-images, where the backlight data serves to represent a brightness of each color contained in a backlight assembly, and the pixel data serves to represent a pixel value of each pixel unit; and sequentially displaying at least part of sub-images in the plurality of frames of sub-images, in a preset sequence, according to the backlight data and the pixel data of respective frames of sub-images, where the number of frames of displayed sub-images is greater than or equal to the number of channels of the original image, the backlight data of any one frame of displayed sub-image serves to drive the backlight assembly to emit light with all colors contained in the backlight assembly, and the backlight data of the sub-images except the any one frame of displayed sub-image serves to drive the backlight assembly to each time emit light with one color contained in the backlight assembly.

As an alternative embodiment, when the at least part of sub-images to be displayed include the second sub-image, the backlight data of the second sub-image serves to drive the backlight assembly to emit light with all colors contained in the backlight assembly, and the backlight data of the sub-images except the second sub-image serves to drive the backlight assembly to each time emit light with one color contained in the backlight assembly.

As an alternative embodiment, the backlight data of a first frame of sub-image in the at least part of sub-images to be displayed serves to drive the backlight assembly to emit light with all colors contained in the backlight assembly, and the backlight data of subsequent frames of sub-images serves to drive the backlight assembly to each time emit light with one color contained in the backlight assembly.

As an alternative embodiment, the processor 1400 is specifically configured to determine the first sub-image and the second sub-image by:

splitting the original image into a plurality of images each having a single channel, according to the number of channels of the original image, and determining the images each having a single channel as the first sub-images; and determining the second sub-image according to a minimum pixel value of the plurality of first sub-images at a corresponding position.

As an alternative embodiment, the plurality of first sub-images include an image R, an image G and an image B, and when a plurality of frames of original images are acquired, the processor 1400 is specifically configured to:

every displaying four frames of original images, sequentially display three sub-images of each frame of original image according to a following cyclic sequence:

when a first frame of original image is displayed, sequentially display three sub-images in a sequence of the second sub-image of the first frame of original image, the image R of the first frame of original image and the image G of the first frame of original image;

when a second frame of original image is displayed, sequentially display three sub-images in a sequence of the image B of the second frame of original image, the second sub-image of the second frame of original image and the image R of the second frame of original image;

when a third frame of original image is displayed, sequentially display three sub-images in a sequence of the image G of the third frame of original image, the image B of the third frame of original image and the second sub-image of the third frame of original image; and when a fourth frame of original image is displayed, sequentially display three sub-images in a sequence of the image R of the fourth frame of original image, the image G of the fourth frame of original image and the image B of the fourth frame of original image.

As an alternative embodiment, when a plurality of frames of original images are acquired and it is determined that a current frame of original image to be displayed is not a first frame of original image, the processor 1400 is specifically configured to determine the backlight data of the first frame of sub-image in the at least part of sub-images to be displayed by:

when it is determined that the first frame of sub-image is the first sub-image, determining the backlight data of the first frame of sub-image in each partition in the backlight assembly, according to a mean value of the backlight data of the first sub-image of the current frame of original image in the partition and the backlight data of the first sub-image of a previous frame of original image in the partition.

As an alternative embodiment, the processor 1400 is specifically configured to determine the backlight data of the first sub-image by:

determining a maximum difference value in each partition in the backlight assembly, according to a difference value between pixel values of the first sub-image and the second sub-image at a corresponding position in the partition; and determining the backlight data of the first sub-image in each partition, according to the maximum difference value in the partition.

As an alternative embodiment, when a plurality of frames of original images are acquired and it is determined that the current frame of original image to be displayed is not the first frame of original image, the processor 1400 is specifically configured to determine the backlight data of the first frame of sub-image in the at least part of sub-images to be displayed by:

when it is determined that the first frame of sub-image is the second sub-image, determining the backlight data of the first frame of sub-image in each partition in the backlight assembly, according to a mean value of the backlight data of the second sub-image of the current frame of original image in the partition and the backlight data of the second sub-image of a previous frame of original image in the partition.

As an alternative embodiment, the processor 1400 is specifically configured to determine the backlight data of the second sub-image by:

determining the backlight data of the second sub-image in each partition in the backlight assembly, according to a maximum value of pixel values of the second sub-image in the partition.

As an alternative embodiment, the processor 1400 is specifically configured to determine the pixel data of the first sub-image by:

determining the pixel data of the first sub-image, according to a ratio of a difference value between pixel values of the first sub-image and the second sub-image at a corresponding position to the backlight data of a pixel point at the corresponding position in a partition in the backlight assembly.

As an alternative embodiment, when a plurality of frames of original images are acquired and it is determined that the current frame of original image to be displayed is not the first frame of original image, the processor 1400 is specifically configured to determine the pixel data of the first frame of sub-image in the at least part of sub-images to be displayed by:

when it is determined that the first frame of sub-image is the first sub-image, determining the pixel data of the first frame of sub-image, according to:

a difference value between pixel values of the first sub-image and the second sub-image of the current frame of original image at a corresponding position, and a mean value of the backlight data of the first sub-image of the current frame of original image in each partition in the backlight assembly and the backlight data of the first sub-image of a previous frame of original image in the partition.

As an alternative embodiment, when it is determined that the first frame of sub-image is the first sub-image, the processor 1400 is specifically configured to perform:

determining the pixel data of the first frame of sub-image, according to a ratio of the difference value between the pixel values of the first sub-image and the second sub-image at the corresponding position to the mean value of a pixel point at the corresponding position in a partition in the backlight assembly.

As an alternative embodiment, the processor 1400 is specifically configured to determine the pixel data of the second sub-image by:

determining the pixel data of the second sub-image, according to a ratio of each pixel value of the second sub-image to the backlight data of a corresponding partition in the backlight assembly.

As an alternative embodiment, when a plurality of frames of original images are acquired and it is determined that a current frame of original image to be displayed is not the first frame of original image, the processor 1400 is specifically configured to determine the pixel data of the first frame of sub-image in the at least part of sub-images to be displayed by:

when it is determined that the first frame of sub-image is the second sub-image, determining the pixel data of the first frame of sub-image, according to a pixel value of the second sub-image of the current frame of original image, and a mean value of the backlight data of the second sub-image of the current frame of original image in each partition in the backlight assembly and the backlight data of the second sub-image of a previous frame of original image in the partition.

As an alternative embodiment, when it is determined that the first frame of sub-image is the second sub-image, the processor 1400 is specifically configured to perform:

determining the pixel data of the first frame of sub-image, according to a ratio of the pixel value of the second sub-image to the mean value of a corresponding partition in the backlight assembly.

As an alternative embodiment, when a plurality of frames of original images are acquired and it is determined that the current frame of original image to be displayed is not the first frame of original image, the processor 1400 is specifically configured to determine the second sub-image by:

determining the second sub-image, according to a minimum value between a minimum pixel value among respective first sub-images of the current frame of original image at a corresponding position and a minimum pixel value among respective first sub-images of a previous frame of original image at the corresponding position.

As an alternative embodiment, the plurality of first sub-images include an image R, an image G and an image B, and the processor 1400 is specifically configured to perform:

sequentially displaying the plurality of frames of sub-images in a sequence of the second sub-image, the image R, the image G, and the image B.

As an alternative embodiment, the processor 1400 is specifically configured to determine the backlight data of the first sub-image and the second sub-image by:

setting each of the backlight data of the first sub-image and the backlight data of the second sub-image to be a preset value.

As an alternative embodiment, the processor 1400 is specifically configured to determine the pixel data of the first sub-image by:

determining a maximum difference value in each partition in the backlight assembly, according to a difference value between pixel values of the first sub-image and the second sub-image at a corresponding position; and determining the pixel data of the first sub-image, according to a ratio of the difference value corresponding to each pixel position in the first sub-image to the maximum difference value in the partition corresponding to the pixel position.

As an alternative embodiment, the processor 1400 is specifically configured to determine the pixel data of the second sub-image by:

determining a maximum pixel value in each partition in the backlight assembly, according to respective pixel values in the second sub-image; and determining the pixel data of the second sub-image, according to a ratio of each pixel value in the second sub-image to the maximum pixel value in a corresponding partition.

Embodiment 3, based on the same inventive concept, an embodiment of the present disclosure further provides a field sequential display apparatus. Since the apparatus is the apparatus in the method according to the embodiment of the present disclosure, and the principle of the apparatus for solving the problem is similar to that of the method, the implementation of the apparatus may be referred to the implementation of the method, and repeated parts are not described again.

Figure 15:
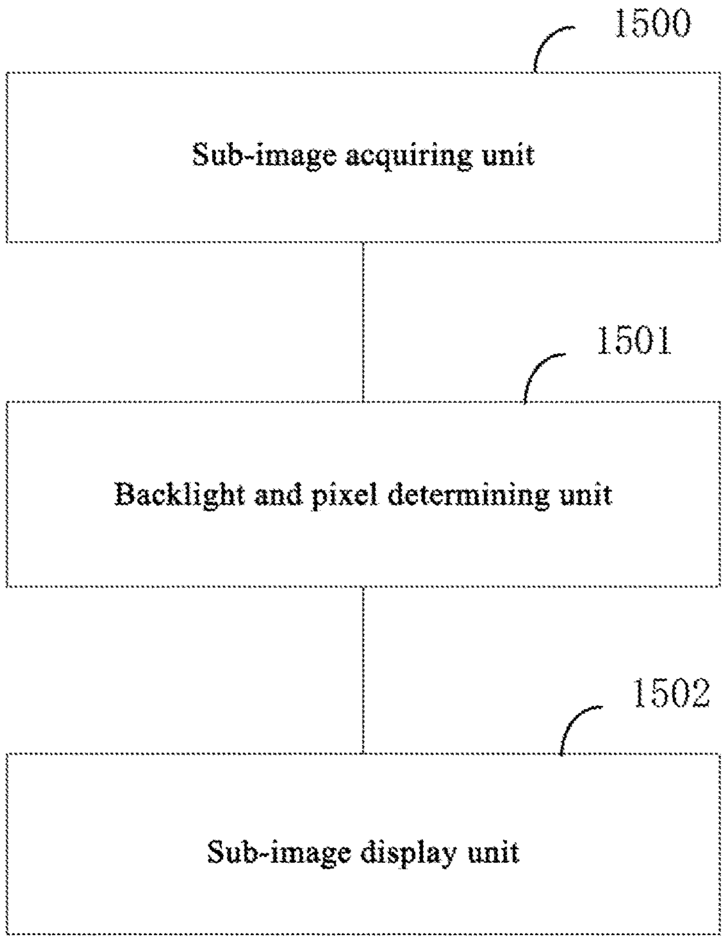
FIG. 15 is a schematic diagram illustrating a field sequential display device according to an embodiment of the disclosure.

As shown in FIG. 15, the apparatus includes:

a sub-image acquiring unit 1500, configured to acquire an original image to be displayed, and determine a plurality of frames of sub-images each having a single channel according to the original image, where the plurality of frames of sub-images include a plurality of first sub-images and a second sub-image determined according to the plurality of first sub-images;

a backlight and pixel determining unit 1501, configured to determine backlight data and pixel data of each of the plurality of frames of sub-images, where the backlight data serves to represent a brightness of each color contained in a backlight assembly, and the pixel data serves to represent a pixel value of each pixel unit; and a sub-image display unit 1502, configured to sequentially display at least part of sub-images in the plurality of frames of sub-images, in a preset sequence, according to the backlight data and the pixel data of respective frames of sub-images, where the number of frames of displayed sub-images is greater than or equal to the number of channels of the original image, the backlight data of any one frame of displayed sub-image serves to drive the backlight assembly to emit light with all colors contained in the backlight assembly, and the backlight data of the sub-images except the any one frame of displayed sub-image serves to drive the backlight assembly to each time emit light with one color contained in the backlight assembly.

As an alternative embodiment, when the at least part of sub-images to be displayed include the second sub-image, the backlight data of the second sub-image serves to drive the backlight assembly to emit light with all colors contained in the backlight assembly, and the backlight data of the sub-images except the second sub-image serves to drive the backlight assembly to each time emit light with one color contained in the backlight assembly.

As an alternative embodiment, the backlight data of a first frame of sub-image in the at least part of sub-images to be displayed serves to drive the backlight assembly to emit light with all colors contained in the backlight assembly, and the backlight data of subsequent frames of sub-images serves to drive the backlight assembly to each time emit light with one color contained in the backlight assembly.

As an alternative embodiment, the sub-image acquiring unit 1500 is specifically configured to determine the first sub-image and the second sub-image by:

splitting the original image into a plurality of images each having a single channel, according to the number of channels of the original image, and determining the images each having a single channel as the first sub-images; and determining the second sub-image according to a minimum pixel value of the plurality of first sub-images at a corresponding position.

As an alternative embodiment, the plurality of first sub-images include an image R, an image G, and an image B, and when a plurality of frames of original images are acquired, the sub-image display unit 1502 is specifically configured to:

every displaying four frames of original images, sequentially display three sub-images of each frame of original image according to a following cyclic sequence:

when a first frame of original image is displayed, sequentially display three sub-images in a sequence of the second sub-image of the first frame of original image, the image R of the first frame of original image and the image G of the first frame of original image;

when a second frame of original image is displayed, sequentially display three sub-images in a sequence of the image B of the second frame of original image, the second sub-image of the second frame of original image and the image R of the second frame of original image;

when a third frame of original image is displayed, sequentially display three sub-images in a sequence of the image G of the third frame of original image, the image B of the third frame of original image and the second sub-image of the third frame of original image; and when a fourth frame of original image is displayed, sequentially display three sub-images in a sequence of the image R of the fourth frame of original image, the image G of the fourth frame of original image and the image B of the fourth frame of original image.

As an alternative embodiment, when a plurality of frames of original images are acquired and it is determined that a current frame of original image to be displayed is not a first frame of original image, the backlight and pixel determining unit 1501 is specifically configured to determine the backlight data of the first frame of sub-image in the at least part of sub-images to be displayed by:

when it is determined that the first frame of sub-image is the first sub-image, determining the backlight data of the first frame of sub-image in each partition in the backlight assembly, according to a mean value of the backlight data of the first sub-image of the current frame of original image in the partition and the backlight data of the first sub-image of a previous frame of original image in the partition.

As an alternative embodiment, the backlight and pixel determining unit 1501 is specifically configured to determine the backlight data of the first sub-image by:

determining a maximum difference value in each partition in the backlight assembly, according to a difference value between pixel values of the first sub-image and the second sub-image at a corresponding position in the partition; and determining the backlight data of the first sub-image in each partition, according to the maximum difference value in the partition.

As an alternative embodiment, when a plurality of frames of original images are acquired and it is determined that a current frame of original image to be displayed is not a first frame of original image, the backlight and pixel determining unit 1501 is specifically configured to determine backlight data of the first frame of sub-image in the at least part of sub-images to be displayed by:

when it is determined that the first frame of sub-image is the second sub-image, determining the backlight data of the first frame of sub-image in each partition in the backlight assembly, according to a mean value of the backlight data of the second sub-image of the current frame of original image in the partition and the backlight data of the second sub-image of a previous frame of original image in the partition.

As an alternative embodiment, the backlight and pixel determining unit 1501 is specifically configured to determine the backlight data of the second sub-image by:

determining the backlight data of the second sub-image in each partition in the backlight assembly, according to a maximum value of pixel values of the second sub-image in the partition.

As an alternative embodiment, the backlight and pixel determining unit 1501 is specifically configured to determine the pixel data of the first sub-image by:

determining the pixel data of the first sub-image, according to a ratio of a difference value between pixel values of the first sub-image and the second sub-image at a corresponding position to the backlight data of a pixel point at the corresponding position in a partition in the backlight assembly.

As an alternative embodiment, when a plurality of frames of original images are acquired and it is determined that a current frame of original image to be displayed is not a first frame of original image, the backlight and pixel determining unit 1501 is specifically configured to determine pixel data of the first frame of sub-image in the at least part of sub-images to be displayed by:

when it is determined that the first frame of sub-image is the first sub-image, determining the pixel data of the first frame of sub-image, according to a difference value between pixel values of the first sub-image and the second sub-image of the current frame of original image at a corresponding position, and a mean value of the backlight data of the first sub-image of the current frame of original image in each partition in the backlight assembly and the backlight data of the first sub-image of a previous frame of original image in the partition.

As an alternative embodiment, when it is determined that the first frame of sub-image is the first sub-image, the backlight and pixel determining unit 1501 is specifically configured for:

determining the pixel data of the first frame of sub-image, according to a ratio of the difference value between the pixel values of the first sub-image and the second sub-image at the corresponding position to the mean value of a pixel point at the corresponding position in a partition in the backlight assembly.

As an alternative embodiment, the backlight and pixel determining unit 1501 is specifically configured to determine the pixel data of the second sub-image by:

determining the pixel data of the second sub-image, according to a ratio of each pixel value of the second sub-image to the backlight data of a corresponding partition in the backlight assembly.

As an alternative embodiment, when a plurality of frames of original images are acquired and it is determined that a current frame of original image to be displayed is not a first frame of original image, the backlight and pixel determining unit 1501 is specifically configured to determine the pixel data of the first frame of sub-image in the at least part of sub-images to be displayed by:

when it is determined that the first frame of sub-image is the second sub-image, determining the pixel data of the first frame of sub-image, according to a pixel value of the second sub-image of the current frame of original image, and a mean value of the backlight data of the second sub-image of the current frame of original image in each partition in the backlight assembly and the backlight data of the second sub-image of a previous frame of original image in the partition.

As an alternative embodiment, when it is determined that the first frame of sub-image is the second sub-image, the backlight and pixel determining unit 1501 is specifically configured for:

determining the pixel data of the first frame of sub-image, according to a ratio of the pixel value of the second sub-image to the mean value of a corresponding partition in the backlight assembly.

As an alternative embodiment, when a plurality of frames of original images are acquired and it is determined that a current frame of original image to be displayed is not a first frame of original image, the sub-image acquiring unit 1500 is specifically configured to determine the second sub-image by:

determining the second sub-image, according to a minimum value between a minimum pixel value among respective first sub-images of the current frame of original image at a corresponding position and a minimum pixel value among the respective first sub-images of a previous frame of original image at the corresponding position.

As an alternative embodiment, the plurality of first sub-images include an image R, an image G, and an image B, and the sub-image display unit 1502 is specifically configured for:

sequentially displaying the plurality of frames of sub-images in a sequence of the second sub-image, the image R, the image G, and the image B.

As an alternative embodiment, the backlight and pixel determining unit is specifically configured to determine the backlight data of the first sub-image and the second sub-image by:

setting each of the backlight data of the first sub-image and the backlight data of the second sub-image to be a preset value.

As an alternative embodiment, the backlight and pixel determining unit 1501 is specifically configured to determine the pixel data of the first sub-image by:

determining a maximum difference value in each partition in the backlight assembly, according to a difference value between pixel values of the first sub-image and the second sub-image at a corresponding position; and determining the pixel data of the first sub-image, according to a ratio of the difference value corresponding to each pixel position in the first sub-image to the maximum difference value in the partition corresponding to the pixel position.

As an alternative embodiment, the backlight and pixel determining unit 1501 is specifically configured to determine the pixel data of the second sub-image by:

determining a maximum pixel value in each partition in the backlight assembly, according to respective pixel values in the second sub-image; and determining the pixel data of the second sub-image, according to a ratio of each pixel value in the second sub-image to the maximum pixel value in a corresponding partition.

Based on the same inventive concept, an embodiment of the present disclosure further provides a computer storage medium storing a computer program which, when executed by a processor, cause the processor to perform the following steps:

acquiring an original image to be displayed, and determining a plurality of frames of sub-images each having a single channel according to the original image, where the plurality of frames of sub-images include a plurality of first sub-images and a second sub-image determined according to the plurality of first sub-images;

determining backlight data and pixel data of each of the plurality of frames of sub-images, where the backlight data serves to represent a brightness of each color contained in a backlight assembly, and the pixel data serves to represent a pixel value of each pixel unit; and sequentially displaying at least part of sub-images in the plurality of frames of sub-images, in a preset sequence, according to the backlight data and the pixel data of respective frames of sub-images, such that the number of frames of displayed sub-images is greater than or equal to the number of channels of the original image, the backlight data of any one frame of displayed sub-image serves to drive the backlight assembly to emit light with all colors contained in the backlight assembly, and the backlight data of the sub-images except the any one frame of displayed sub-image serves to drive the backlight assembly to each time emit light with one color contained in the backlight assembly.

As will be appreciated by those skilled in the art, embodiments of the present disclosure may be provided as a method, a system, or a computer program product. Accordingly, the present disclosure may take the form of an entirely hardware embodiment, an entirely software embodiment or an embodiment combining software and hardware aspects. Furthermore, the present disclosure may take the form of a computer program product which is embodied on one or more computer-usable storage medium (including, but not limited to, disk storage, optical storage, and the like) having computer-usable program code embodied therein.

The present disclosure is described with reference to flowcharts and/or block diagrams of methods, devices (systems), and computer program products according to the embodiments of the present disclosure. It will be understood that each flow and/or block of the flowcharts and/or block diagrams, and combinations of flows and/or blocks in the flowcharts and/or block diagrams, can be implemented by computer program instructions. These computer program instructions may be provided to a processor of a general purpose computer, special purpose computer, embedded processor, or other programmable data processing device to produce a machine instruction, such that the instructions, which execute via the processor of the computer or other programmable data processing device, create a device for implementing the functions specified in a flow or flows in the flowchart and/or a block or blocks in the block diagram.

These computer program instructions may also be stored in a computer-readable memory that can direct a computer or other programmable data processing device to function in a particular manner, such that the instructions stored in the computer-readable memory produce an article of manufacture including instruction device which implement the function specified in a flow or flows in the flowchart and/or a block or blocks in the block diagram.

These computer program instructions may also be loaded onto a computer or other programmable data processing device to cause a series of operational steps to be performed on the computer or other programmable device to produce a computer implemented process, such that the instructions which execute on the computer or other programmable device provide steps for implementing the functions specified in a flow or flows in the flowchart and/or a block or blocks in the block diagram.

It will be apparent to those skilled in the art that various changes and variations may be made to the present disclosure without departing from the spirit and scope of the present disclosure. Thus, if such modifications and variations to the present disclosure are within the scope of the claims of the present disclosure and their equivalents, the present disclosure is also intended to encompass such modifications and variations.

What is claimed is:

1. A display method for inhibiting color separation, comprising:

acquiring an original image to be displayed, and determining a plurality of frames of sub-images each having a single channel according to the original image, wherein the plurality of frames of sub-images comprise a plurality of first sub-images and a second sub-image determined according to the plurality of first sub-images;

determining backlight data and pixel data of each of the plurality of frames of sub-images, wherein the backlight data serves to represent a brightness of each color contained in a backlight assembly, and the pixel data serves to represent a pixel value of each pixel unit; and sequentially displaying at least part of sub-images in the plurality of frames of sub-images, in a preset sequence, according to the backlight data and the pixel data of respective frames of sub-images, wherein the number of frames of displayed sub-images is greater than or equal to the number of channels of the original image, the backlight data of any one frame of displayed sub-image serves to drive the backlight assembly to emit light with all colors contained in the backlight assembly, and the backlight data of the sub-images except the any one frame of displayed sub-image serves to drive the backlight assembly to each time emit light with one color contained in the backlight assembly, wherein a plurality of frames of original images are acquired and it is determined that a current frame of original image to be displayed is not a first frame of original image, and the pixel data of a first frame of sub-image in the at least part of sub-images to be displayed is determined by:

when it is determined that the first frame of sub-image is the first sub-image, determining the pixel data of the first frame of sub-image, according to:

a difference value between pixel values of the first sub-image and the second sub-image of the current frame of original image at a corresponding position, and a mean value of the backlight data of the first sub-image of the current frame of original image in each partition in the backlight assembly and the backlight data of the first sub-image of a previous frame of original image in the partition.

2. The display method of claim 1, wherein the at least part of sub-images to be displayed comprise the second sub-image, the backlight data of the second sub-image serves to drive the backlight assembly to emit light with all colors contained in the backlight assembly, and the backlight data of the sub-images except the second sub-image serves to drive the backlight assembly to each time emit light with one color contained in the backlight assembly.

3. The display method of claim 1, wherein the backlight data of a first frame of sub-image in the at least part of sub-images to be displayed serves to drive the backlight assembly to emit light with all colors contained in the backlight assembly, and the backlight data of subsequent frames of sub-images serves to drive the backlight assembly to each time emit light with one color contained in the backlight assembly.

4. The display method of claim 1, wherein the plurality of first sub-images and the second sub-image are determined by:

splitting the original image into a plurality of images each having a single channel, according to the number of channels of the original image, and determining the plurality of images each having a single channel as the plurality of first sub-images; and determining the second sub-image according to a minimum pixel value of the plurality of first sub-images at a corresponding position.

5. The display method of claim 1, wherein the plurality of first sub-images comprise an image R, an image G and an image B, and a plurality of frames of original images are acquired, the sequentially displaying the at least part of sub-images in the plurality of frames of sub-images in the preset sequence comprises:

every displaying four frames of original images, sequentially displaying three sub-images of each frame of original image according to a following cyclic sequence:

when a first frame of original image is displayed, sequentially displaying three sub-images in a sequence of the second sub-image of the first frame of original image, the image R of the first frame of original image and the image G of the first frame of original image;

when a second frame of original image is displayed, sequentially displaying three sub-images in a sequence of the image B of the second frame of original image, the second sub-image of the second frame of original image and the image R of the second frame of original image;

when a third frame of original image is displayed, sequentially displaying three sub-images in a sequence of the image G of the third frame of original image, the image B of the third frame of original image and the second sub-image of the third frame of original image; and when a fourth frame of original image is displayed, sequentially displaying three sub-images in a sequence of the image R of the fourth frame of original image, the image G of the fourth frame of original image and the image B of the fourth frame of original image.

6. The display method of claim 1, wherein a plurality of frames of original images are acquired and it is determined that a current frame of original image to be displayed is not a first frame of original image, and the backlight data of a first frame of sub-image in the at least part of sub-images to be displayed is determining by:

when it is determined that the first frame of sub-image is the first sub-image, determining the backlight data of the first frame of sub-image in each partition in the backlight assembly, according to a mean value of the backlight data of the first sub-image of the current frame of original image in the partition and the backlight data of the first sub-image of a previous frame of original image in the partition.

7. The display method of claim 1, wherein the backlight data of each of the plurality of first sub-images is determined by:

determining a maximum difference value in each partition in the backlight assembly, according to a difference value between pixel values of the first sub-image and the second sub-image at a corresponding position in the partition; and determining the backlight data of the first sub-image in each partition, according to the maximum difference value in the partition.

8. The display method of claim 1, wherein a plurality of frames of original images are acquired and it is determined that a current frame of original image to be displayed is not a first frame of original image, and the backlight data of a first frame of sub-image in the at least part of sub-images to be displayed is determined by:

when it is determined that the first frame of sub-image is the second sub-image, determining the backlight data of the first frame of sub-image in each partition in the backlight assembly, according to a mean value of the backlight data of the second sub-image of the current frame of original image in the partition and the backlight data of the second sub-image of a previous frame of original image in the partition.

9. The display method of claim 1, wherein the backlight data of the second sub-image is determined by:

determining the backlight data of the second sub-image in each partition in the backlight assembly, according to a maximum value of pixel values of the second sub-image in the partition.

10. The display method of claim 1, wherein the pixel data of each of the plurality of first sub-images is determined by:

determining the pixel data of the first sub-image, according to a ratio of a difference value between pixel values of the first sub-image and the second sub-image at a corresponding position to the backlight data of a partition, where a pixel point at the corresponding position is located, in the backlight assembly.

11. The display method of claim 1, wherein it is determined that the first frame of sub-image is the first sub-image, and the determining the pixel data of the first frame of sub-image comprises:

determining the pixel data of the first frame of sub-image, according to a ratio of the difference value between the pixel values of the first sub-image and the second sub-image at the corresponding position to the mean value of the partition, where a pixel point at the corresponding position is located, in the backlight assembly.

12. The display method of claim 1, wherein the pixel data of the second sub-image is determined by:

determining the pixel data of the second sub-image, according to a ratio of each pixel value of the second sub-image to the backlight data of a corresponding partition in the backlight assembly.

13. The display method of claim 1, wherein a plurality of frames of original images are acquired and it is determined that a current frame of original image to be displayed is not a first frame of original image, and the second sub-image is determined by:

determining the second sub-image, according to a minimum value between a minimum pixel value among respective first sub-images of the current frame of original image at a corresponding position and a minimum pixel value among respective first sub-images of a previous frame of original image at the corresponding position.

14. The display method of claim 1, wherein the plurality of first sub-images comprise an image R, an image G and an image B, and the sequentially displaying the at least some of sub-images in the plurality of frames of sub-images in the preset sequence comprises:

sequentially displaying the plurality of frames of sub-images in a sequence of the second sub-image, the image R, the image G, and the image B, and/or the backlight data of each of the plurality of first sub-images and the second sub-image is determined by:

setting each of the backlight data of the first sub-image and the backlight data of the second sub-image to be a preset value.

15. The display method of claim 1, wherein the pixel data of each of the plurality of first sub-images is determined by:

determining a maximum difference value in each partition in the backlight assembly, according to a difference value between pixel values of the first sub-image and the second sub-image at a corresponding position; and determining the pixel data of the first sub-image, according to a ratio of the difference value corresponding to each pixel position in the first sub-image to the maximum difference value in the partition corresponding to the pixel position, and/or the pixel data of the second sub-image is determined by:

determining a maximum pixel value in each partition in the backlight assembly, according to respective pixel values in the second sub-image; and determining the pixel data of the second sub-image, according to a ratio of each pixel value in the second sub-image to the maximum pixel value in a corresponding partition.

16. A field sequential display device, comprising a processor and a memory, wherein the memory is configured to store a program executable by the processor, and the processor is configured to read the program in the memory and to perform steps of the display method of claim 1.

17. A non-transitory computer storage medium storing a computer program thereon which, when executed by a processor, cause the processor to perform steps of the display method of claim 1.

18. A display method for inhibiting color separation, comprising:

acquiring an original image to be displayed, and determining a plurality of frames of sub-images each having a single channel according to the original image, wherein the plurality of frames of sub-images comprise a plurality of first sub-images and a second sub-image determined according to the plurality of first sub-images;

determining backlight data and pixel data of each of the plurality of frames of sub-images, wherein the backlight data serves to represent a brightness of each color contained in a backlight assembly, and the pixel data serves to represent a pixel value of each pixel unit; and sequentially displaying at least part of sub-images in the plurality of frames of sub-images, in a preset sequence, according to the backlight data and the pixel data of respective frames of sub-images, wherein the number of frames of displayed sub-images is greater than or equal to the number of channels of the original image, the backlight data of any one frame of displayed sub-image serves to drive the backlight assembly to emit light with all colors contained in the backlight assembly, and the backlight data of the sub-images except the any one frame of displayed sub-image serves to drive the backlight assembly to each time emit light with one color contained in the backlight assembly, wherein a plurality of frames of original images are acquired and it is determined that a current frame of original image to be displayed is not a first frame of original image, and the pixel data of a first frame of sub-image in the at least part of sub-images to be displayed is determined by:

when it is determined that the first frame of sub-image is the second sub-image, determining the pixel data of the first frame of sub-image, according to a pixel value of the second sub-image of the current frame of original image, and a mean value of the backlight data of the second sub-image of the current frame of original image in each partition in the backlight assembly and the backlight data of the second sub-image of a previous frame of original image in the partition.

19. The display method of claim 18, wherein it is determined that the first frame of sub-image is the second sub-image, and the determining the pixel data of the first frame of sub-image comprises:

determining the pixel data of the first frame of sub-image, according to a ratio of the pixel value of the second sub-image to the mean value of a corresponding partition in the backlight assembly.

* * * * *